US011599737B1

United States Patent
Ahmed et al.

(10) Patent No.: US 11,599,737 B1
(45) Date of Patent: Mar. 7, 2023

(54) SYSTEM FOR GENERATING TAGS

(71) Applicant: AMAZON TECHNOLOGIES, INC., Seattle, WA (US)

(72) Inventors: Ejaz Ahmed, Marlborough, MA (US); Jeremy Samuel De Bonet, Southborough, MA (US); Oded Maron, Sudbury, MA (US); Mirko Ristivojevic, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 60 days.

(21) Appl. No.: 17/225,407

(22) Filed: Apr. 8, 2021

Related U.S. Application Data

(62) Division of application No. 16/127,000, filed on Sep. 10, 2018, now Pat. No. 10,984,205.

(51) Int. Cl.
*G06K 7/10* (2006.01)
*G06K 7/14* (2006.01)

(52) U.S. Cl.
CPC ......... *G06K 7/1092* (2013.01); *G06K 7/1417* (2013.01); *G06K 7/1473* (2013.01); *G06K 7/1478* (2013.01)

(58) Field of Classification Search
CPC .. G06K 7/1092; G06K 7/1417; G06K 7/1473; G06K 7/1478; G06K 19/06037
See application file for complete search history.

(56) References Cited

U.S. PATENT DOCUMENTS

| | | | |
|---|---|---|---|
| 2017/0134344 A1* | 5/2017 | Wu | H04L 67/535 |
| 2018/0025263 A1* | 1/2018 | Toyoizumi | G06K 19/0614 235/494 |
| 2021/0248436 A1* | 8/2021 | Alon | G06K 19/06037 |

* cited by examiner

*Primary Examiner* — Laura A Gudorf
(74) *Attorney, Agent, or Firm* — Lindauer Law, PLLC

(57) ABSTRACT

A tag with sufficient variability is generated. The tag facilitates quick location and processing within a facility. During generation, a matrix representative of a possible tag may be tested for sufficient variability. A two-dimensional matrix representing the possible tag may include different bit values at different positions. A variability metric of the matrix is performed to check the variability between adjacent elements of the matrix. This variability metric of the matrix is then compared against a variability threshold value. If the variability metric of the matrix falls below the threshold value, the matrix is flagged as unusable. If the variability metric of the matrix exceeds the threshold value, the matrix can be used to generate a tag with sufficient variability. Once generated, the tag can be presented and affixed to an item or object to help identify and locate the item within the facility.

20 Claims, 12 Drawing Sheets

SYSTEM FOR GENERATING TAGS

PRIORITY

This application is a divisional of, and claims priority to, U.S. patent application Ser. No. 16/127,000, filed on Sep. 10, 2018, entitled "Error Tolerant System For Reading Tags", which is hereby incorporated by reference in its entirety.

BACKGROUND

An optically readable machine-readable tag ("tag") may be used to store and convey data. For example, a tag may be placed or printed on an item to provide information about the item, such as a stock keeping unit value, handling instructions, and so forth. In another example, a tag may be presented on a display device, such as on the screen of a smartphone. Data encoded by the tag may be read and used by other systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
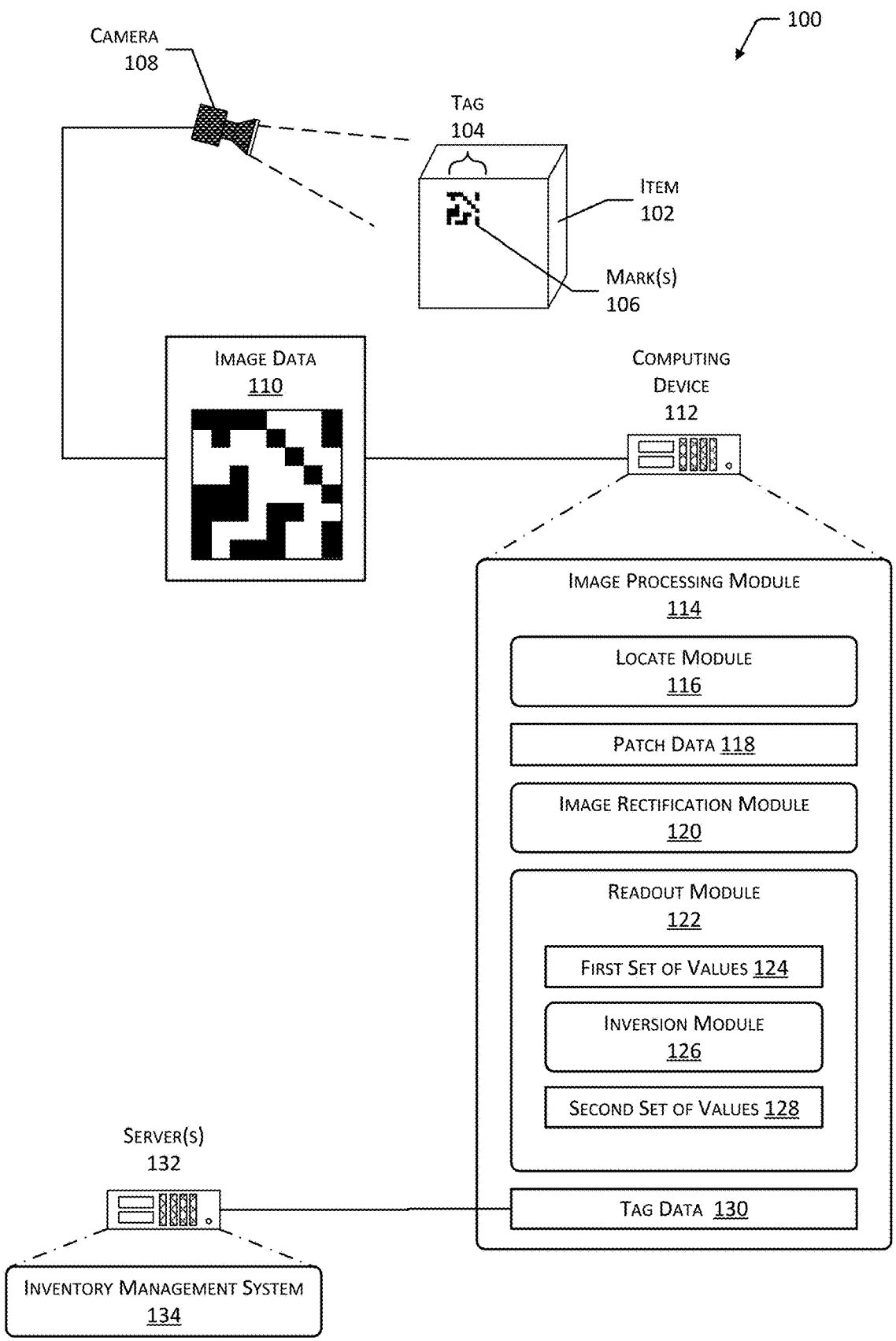
FIG. 1 illustrates a system that processes image data to find and read a tag comprising cells to determine tag data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DESCRIPTION

Organizations may use tags to store and provide information about an item. Tags may be printed on labels that are then affixed to the item, printed on the item, and so forth. For example, a tag encoding information about a destination shipment address may be printed and then affixed to a parcel to facilitate shipment of the parcel. In another example, a tag encoding stock keeping unit (SKU) data may be printed on an item's box to facilitate identification of the box. In some implementations, tags may be presented using a display device. For example, a tag may be presented on a screen of a display device.

The tags may comprise marks of differing characteristics, such as color, that are placed in a particular arrangement to encode data. For example, the tag may comprise white and black marks arranged in a one-dimensional array (1D) or a two-dimensional (2D) array. Continuing the example, when white and black or other binary marking pairs are used, each mark is able to represent a single bit of data, such as a "0" or "1" value.

Existing tag configurations and the associated systems to determine the data encoded by those tags exhibit several drawbacks. The data capacity of a tag is constrained by the size of the tag, number of marks that are used for purposes other than usable tag data, and so forth. For example, an 8×8 array of marks can represent more data than a 2×2 array. Existing tags may use a significant number of marks in the array to designate orientation, boundary of the mark, and so forth. For example, an existing tag configuration may use all of the bits around a perimeter of the tag as fiducials to facilitate the determination of the edges and orientation of the tag. Continuing this example, 28 bits of the 64 bits in the 8×8 array are no longer available for data storage, producing almost a 44 percent reduction in the amount of available storage. Additional marks may be used to provide for redundancy, data correction, padding, "quiet zones" and so forth. As a result, the overall number of bits of tag data, or actual payload that is usable to convey information, may be further reduced. Marks may be used to redundantly encode data or to convey error correction data that is used to improve the ability of the existing tags to be read. However, as mentioned above, this reduces the number of marks that are available to encode tag data. These and other factors significantly limit the utility of existing tag designs to store larger quantities of data.

It is advantageous to be able to either encode a relatively large quantity of tag data in a tag. For example, the tag data may be used to encode information such as an item identifier, data and time produced, expiration date, production batch, information about handling, information about shipping, and so forth. However, given the limitation of the existing systems, as the quantity of information to be included in the tag data is increased, the size of the tags increases beyond feasible sizes. Generally speaking, it is desired to have tags use as little space as possible while maintaining the ability to read the tags from a desired minimum working distance. This leaves more space free on the item for other purposes, such as aesthetic considerations, human-readable labelling, package design, and so forth.

Described in this disclosure are techniques to generate, locate, and readout tags. These techniques provide significant increases in the amount of usable data that may be stored while improving the ability to tolerate errors that may occur due to corruption of the tag, misreads of one or more marks, and so forth.

The tags described in this disclosure use a limited number of reference cells to designate the boundary and orientation of the mark. For example, each corner of the tag may be represented by a black mark, with a predefined pattern of marks at one or two corners to determine orientation. This increases the number of marks available for the encoding of other information such as error correction and tag data.

Tags are used that exhibit a minimum amount of variability in the values of adjacent marks. For example, a variability metric may be calculated that indicates the "checkerboardiness" of the 2D tag. During tag creation, those tags with patterns exhibiting a variability metric below a threshold are not used.

Various techniques may be used to determine the variability metric. In one implementation, within a sliding window, an average of a difference between the values of a center mark and those to the left, right, above, and below may be calculated. The averages for the windows may be summed, and the sum may be used to determine the variability metric.

In some implementations, the variability metric may be used to locate a tag within an image. For example, a sliding window may be used to analyze different portions of an image, with a variability metric determined for each one. Based on the variability metric, a particular region within the image may be designated as a possible tag. The possible tag may be tested to determine if the predefined pattern of reference cells is present, and if so, the process proceeds to divide the tag into a plurality of cells. For example, if the system is configured to process an 8×8 array of marks, the image of the tag may be divided into an 8×8 array of cells, with each cell comprising one or more pixels in the image that are associated with a particular mark.

A cell score is determined for each cell. In one implementation, the cell score may comprise convolving pixel intensity values for pixels within each cell using a Gaussian filter to generate convolved data. This calculation results in more weight being given to the intensity values of the pixels in the center of the cell and less weight being given to the intensity values of the pixels at the edges. The cell score may comprise the sum of the convolved pixel intensity values within the cell.

Probability distribution data is generated using the cell scores. For example, the probability distribution data may comprise a probability distribution function that describes a first probability that a particular cell score is indicative of a first cell value (such as white) or a second probability that the particular cell score is indicative of a second cell value (such as black).

The probability distribution data is used to evaluate the cell scores for each cell and determine a cell value for each cell. For example, the cell value may indicate that the cell is white or black. A confidence value that is indicative of a likelihood that the cell has a particular value may be determined using the first and second probabilities. Confidence value data may be generated that indicates the cell value and associated confidence value for each cell.

A first set of values is determined based on the cell values and their associated confidence values. For example, the first set of values may comprise a matrix, with elements of that matrix comprising a cell value and a confidence value for each cell.

A readout system uses a validation check to test at least a portion of the first set of values to determine if they are representative of valid data. For example, a hash function may be used to process at least a portion of the elements in the matrix and generate a hash value. The hash value may then be compared to a previously stored value, or to a value that is encoded by the cell values of another portion of the elements in the matrix. A first validation check is performed and, if the data is deemed to be valid, the cell values in the matrix are used to generate tag data.

If the data is deemed to be invalid, a set of low confidence cell values is determined. For example, the cell values may be ranked by their associated confidence values, and the cell values with the ten lowest confidence cell values may be determined. A second set of cell values is determined in which one or more of the low confidence cell values are changed. For example, when the marks are representative of binary values, one or more of the low confidence cell values may be "flipped" or inverted from "0" to "1" (equivalent to white to black) or "1" to "0" (equivalent to black to white).

A second validation check is performed on the second set of cell values. If the second set of cell values is deemed to be valid, the cell values in the second set of cell values are used to generate the tag data. If the second validation check fails, the system may generate a third set of cell values in which one or more of the low confidence cell values have been changed. For example, the process may iterate through various combinations or permutations of changing individual cell values or groups of cells until a set of cell values is determined that passes the validation check, or until a maximum number of iterations is reached. Various techniques may be used to determine which cell values to change. For example, the cell value with the lowest confidence cell value may be inverted during a first iteration, the two cell values associated with the two lowest confidence cell values may be inverted during a second iteration, and so forth. These techniques are computationally efficient and may be performed very rapidly, reducing the latency in generating tag data.

The techniques and devices described in this disclosure allow for the use of tags that encode larger quantities of tag data per unit area than previously available. In some situations, this may allow for one or more of a reduction in tag size or an increase in the tag data encoded and conveyed by the tag. The use of the confidence values and the process of changing the cell values of one or more of the low confidence cells allow the system to produce tag data in situations that would otherwise be unreadable. As a result, the system is able to tolerate errors resulting from tag defacement, tag misprints, processing errors, and so forth, while still producing tag data. The techniques for reading the tag, including the determination of the confidence values and the inversion of selected cell values are computationally efficient and able to operate with low latency using relatively inexpensive hardware. For example, the techniques described in this disclosure may be quickly performed using single board computers or other computer systems with modest memory and computational capabilities. Continuing the example, the image processing to determine the tag data may be performed at the camera, eliminating the need to transfer large image files across a network. This reduces network bandwidth requirements and also reduces the overall latency in the system from scan to readout of tag data. These techniques significantly reduce or eliminate the constraints of traditional systems, allowing the system described in this disclosure to be implemented in a wide variety of different environments and for a wide variety of uses.

FIG. 1 illustrates a system 100 that processes image data to find and read a tag comprising marks to determine tag data, according to some implementations. Organizations may move, handle, store, ship, or otherwise interact with items 102. For example, items 102 may comprise products for sale, parcels, individual components used during manufacture, tickets, printed items, and so forth.

To facilitate these interactions, items 102 may have one or more tags 104. Each tag 104 includes marks 106, with the color and position of the marks 106 used to encode data. For example, the tag 104 may comprise an 8×8 square array of cells. The relative position of a cell and whether it exhibits a first cell value (such as white) or a second cell value (such as black) may be used to encode tag data. The tag data may include shipment information, stock keeping unit (SKU) information, serial number information, expiration date information, error correction information, a network address, and so forth.

In some implementations the tag 104 may be printed onto, etched into, embossed into, or otherwise incorporated into the item 102. In other implementations the tag 104 may be printed onto labels, placards, or other objects that may then be affixed to the item 102.

The marks 106 in the tag 104 may be designed to be visible at one or more wavelengths that are detectable by a camera 108. For example, the marks 106 may be apparent under visible light, infrared, ultraviolet, may fluoresce, and so forth. In some situations, the marks 106 may be invisible or only slightly apparent to the unaided eye. The tag 104 may be illuminated by a light source. For example, the light source may comprise a light emitting diode (LED), quantum dot, incandescent lamp, fluorescent lamp, and so forth. The light source may provide illumination of at least a portion of the item 102, and may be integrated with the camera 108, or be a part of other fixtures such as the overhead lights.

To encode data, the tag 104 may utilize marks 106 that have two or more different values or "colors". While this disclosure may describe a first cell value as being "white" and representative of a binary zero while a second cell value is "black" and representative of a binary one, it is understood that these two values may be swapped.

The camera 108 may comprise one or more of a photomultiplier device, charge coupled device, complementary metal oxide semiconductor, microbolometer, and so forth. The camera 108 may be configured to generate image data 110. For example, the image data 110 may comprise a bitmap. In some implementations the camera 108 may acquire images at between 30 frames per second (FPS) and 120 FPS.

The camera 108 may operate at some distance from the item 102. For example, camera 108 may be between two and four meters away from the item 102. In one implementation the camera 108 may be mounted overhead within the facility, such that during placement of an item 102 to or removal from an inventory location such as a shelf, the image data 110 of the marks 106 may be generated.

The image data 110 is provided to a computing device 112. In some implementations the camera 108 and the computing device 112 may be incorporated into a common chassis or assembly. The computing device 112 may include an image processing module 114 which includes a locate module 116, an image rectification module 120, and a readout module 122. The locate module 116 is configured to determine patch data 118 that is indicative of one or more "patches" or regions of the image data 110 that could be tags 104. In one implementation the locate module 116 may determine a variability metric for each region. If the variability metric for a region is greater than a threshold value, that region may be deemed to contain a tag 104 and may be further processed.

In one implementation, the variability metric may be determined using groups of pixels arranged into cells or based on individual pixel values. For example, the variability metric may be determined based on the binary values of each cell in a predetermined grid of cells that are adjacent to a currently selected cell. Continuing the example, a difference between a cell value of the currently selected cell and a cell value of an adjacent cell may be calculated. An absolute value of the difference is determined. A sum of the absolute values of the differences for the cells that are adjacent to the currently selected cell may then be calculated. A sliding window technique that shifts the location of the currently selected cell is used to determine a plurality of sums. The variability metric may comprise a sum of these plurality of sums. In other implementations other techniques may be used. For example, for a given group of pixels, a local entropy value may be determined. A plurality of local entropy values may then be used to determine the variability metric.

The image rectification module 120 may perform one or more functions, such as rectifying the patch indicated by the patch data 118. For example, the rectification process may comprise applying a transformation to the patch data 118 such that the four corners of the tag as depicted therein form a rectangle. This transformation may be visualized as leaving the content of the individual values of the pixels unchanged but deforming a grid which those pixels inhabit. This deformed grid may then be used to map a particular pixel value at a particular set of coordinates in the image data 110 to a new set of coordinates in a rectified patch data. The rectified patch data contains a representation of the tag 104 in which perspective effects are below a threshold value. In one implementation, the perspective effect may be determined by calculating an apparent angular deviation between a plane of the tag 104 and a plane that is orthonormal to an image plane of a camera that captured the image. In another implementation, the perspective effect may be determined by finding one or more features of the tag 104 and determining a variance between those features. For example, the features may be straight edges of the tag 104, and the variance may be a measurement of an angle between two adjacent edges. If an angle at a vertex of two adjacent sides of a rectangular tag is 88 degrees, and the threshold is that the angle must be between 85 and 95 degrees, the image may be determined to be rectified.

As a result of rectification, the appearance of the tag 104 in the rectified patch data appears as if the tag 104 was imaged with a camera 108 having a center of an optical axis of that camera 108 centered on the tag 104 and that optical axis being perpendicular to a plane of the tag 104. For example, the rectified patch data is a close representation of the tag 104 as it appears on the item 102. In implementations where the tag 104 is rectangular, opposite edges of the tag 104 within the rectified patch data will be approximately parallel and the corners between adjacent edges would be approximately 90 degrees. The rectified patch data may then subsequently be processed by the readout module 122, as described next.

The readout module 122 processes the rectified patch data to determine a first set of values 124. Cell boundaries are designated in the rectified patch data. Information about the tag 104 may be retrieved that indicates the tag 104 is composed of marks 106 arranged in x rows and y columns. This information may be retrieved and used to determine the cell boundaries. For example, given that the tag 104 is known to comprise an 8×8 square grid of cells, the rectified patch data may be divided into a predetermined grid of cells that contains 8 rows and 8 columns of cells. Each cell comprises one or more pixels in the image data 110 that are associated with a particular mark 106.

A cell score is determined for each cell. In one implementation, the cell score may comprise convolving pixel intensity values for pixels within each cell using a Gaussian filter to generate convolved data. This calculation results in more weight being given to the intensity values of the pixels in the center of the cell and less weight being given to the intensity of the pixels at the edges. The cell score may comprise the sum of the convolved pixel intensity values within the cell.

Probability distribution data is generated using the cell scores. For example, the probability distribution data may comprise a probability distribution function that describes a first probability that a particular cell score is indicative of a first cell value (such as white) or a second probability that the particular cell score is indicative of a second cell value (such as black).

The probability distribution data is used to evaluate the cell scores for each cell and determine a cell value for each cell. For example, the cell value may indicate that the cell is white or black. A confidence value that is indicative of a likelihood that the cell has a particular value may be determined using the first and second probabilities. Confidence value data may be generated that indicates the cell value and associated confidence value for each cell.

A first set of values 124 is determined based on the cell values and their associated confidence values. For example, the first set of values 124 may comprise a matrix with elements that include a cell value and a confidence value for each cell.

A first validation check is performed on at least a portion of the first set of values 124. For example, the validation check may comprise using a hash function to process the at least a portion of the elements in the matrix and generate a hash value. The hash value may then be compared to a previously stored value, or to a value that is encoded by the cell values of another portion of the elements in the matrix. If the first validation check indicates that the cell values in the first set of values 124 is valid, the readout module 122 may generate the tag data 130 based on the first set of values 124.

In some implementations, the generation of the tag data 130 may comprise structuring the first set of values 124 into a particular format. In other implementations, the generation of the tag data 130 may comprise remapping, decoding, or otherwise manipulating the data that is represented in the matrix to provide tag data 130. For example, the generation of the tag data 130 may comprise using one or more algorithms to associate particular bit values at particular positions within the matrix as being representative of particular alphanumeric values, remove error correction data, padding data, implement a decoding algorithm, and so forth.

If the first set of values 124 fails the first validation check, an inversion module 126 generates a second set of values 128 in which one or more of the cell values with low confidence values have been changed from a first value to a second value. For example, the inversion module 126 may generate the second set of values 128 by inverting the cell value that has the lowest confidence value, such as by changing from a binary 0 to a binary 1, or vice versa.

A second validation check is performed on the second set of values 128. If the second validation check indicates that the cell values in the second set of values 128 is valid, the readout module 122 may generate the tag data 130 based on the second set of values 128. However, if the second validation check fails, the readout module 122 may iteratively change one or more of the cell values with low confidence values, testing at least a portion of the resulting set of cell values for validity. When a valid set of cell values is determined, the tag data 130 is generated from that valid set. In some implementations, the process may stop when a threshold number of iterations have been processed. Operation of the readout module 122 is discussed in more detail below with regard to FIG. 6. Various techniques for determining which cell values to change are discussed with regard to FIG. 8.

The tag data 130 may be sent to another system, such as a server 132 that provides at least part of the functionality of an inventory management system 134. For example, the tag data 130 may comprise data indicative of a SKU number. Based on information such as a previously determined location of the camera 108, the inventory management system 134 may determine that an item 102 with that SKU number is present at that location. The inventory management system 134 is discussed in more detail at least in FIGS. 11-12.

Figure 2:
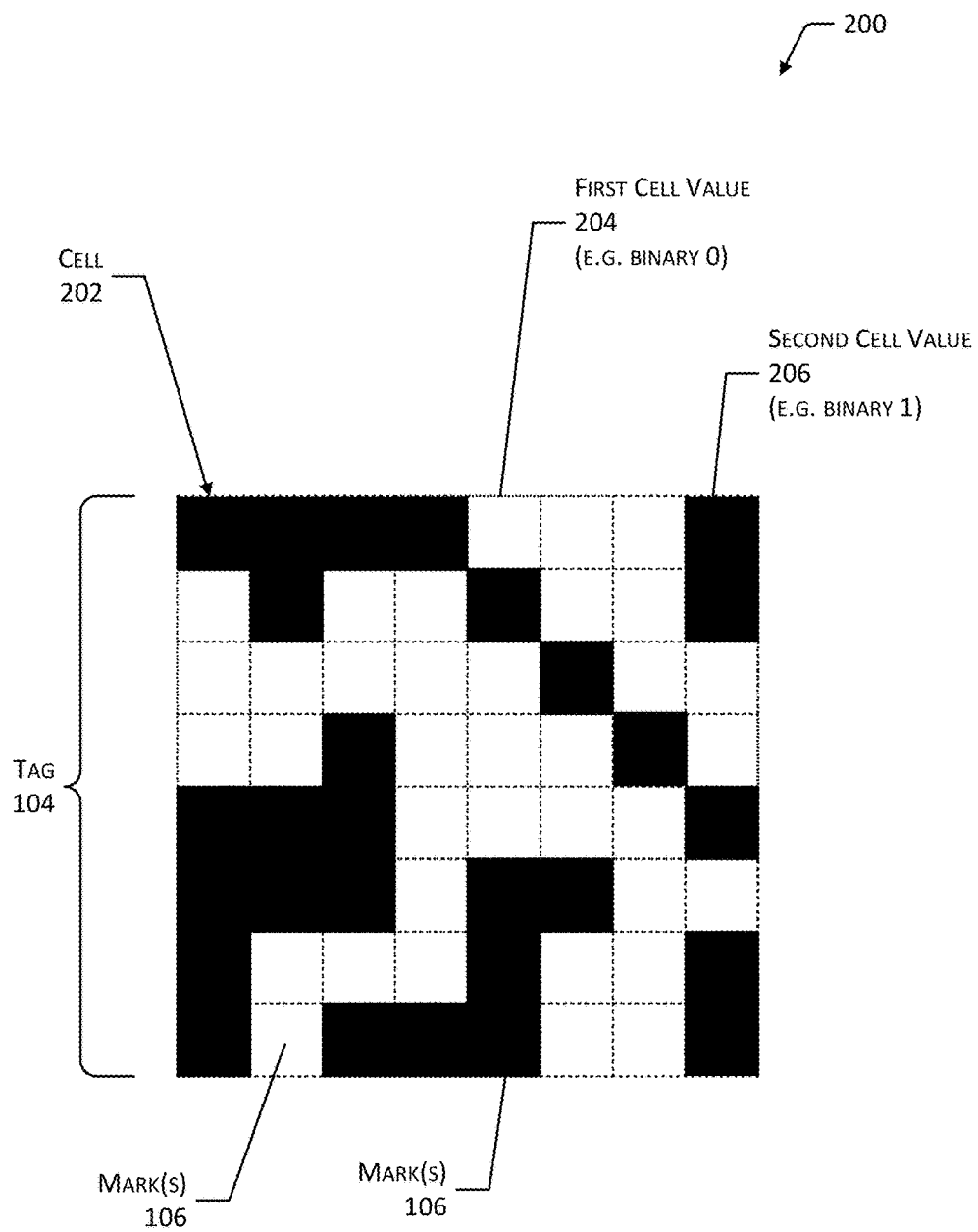
FIG. 2 illustrates a tag and the cells that are used to encode data, according to some implementations.

FIG. 2 is an illustration 200 of a tag 104 and the marks 106 that are used to encode tag data 130, according to some implementations. The tag 104 is depicted as it would appear when imaged by the camera 108.

In this illustration the tag 104 is comprised of cells 202. Each cell 202 may be square, having a height and width that are at least approximately equal. In other implementations, each cell 202 may comprise a rectangle with differing height and width. The cells 202 may be arranged into a rectangle. For example, the tag 104 in this illustration comprises an 8×8 two-dimensional array of cells 202. Each cell 202 contains or comprises a mark 106 that is representative of either a first cell value 204 or a second cell value 206. In this illustration the first cell value 204 is depicted as a white square and is representative of a binary "0" while the second cell value 206 is depicted as a black square and is representative of a binary "1". In other implementations this arrangement may be inverted, such that white is representative of a binary "1". While only two cell values, depicted as black and white, are shown, it is understood that in other implementations other values may be used. For example, marks 106 with different colors or shades may be used.

Figure 3:
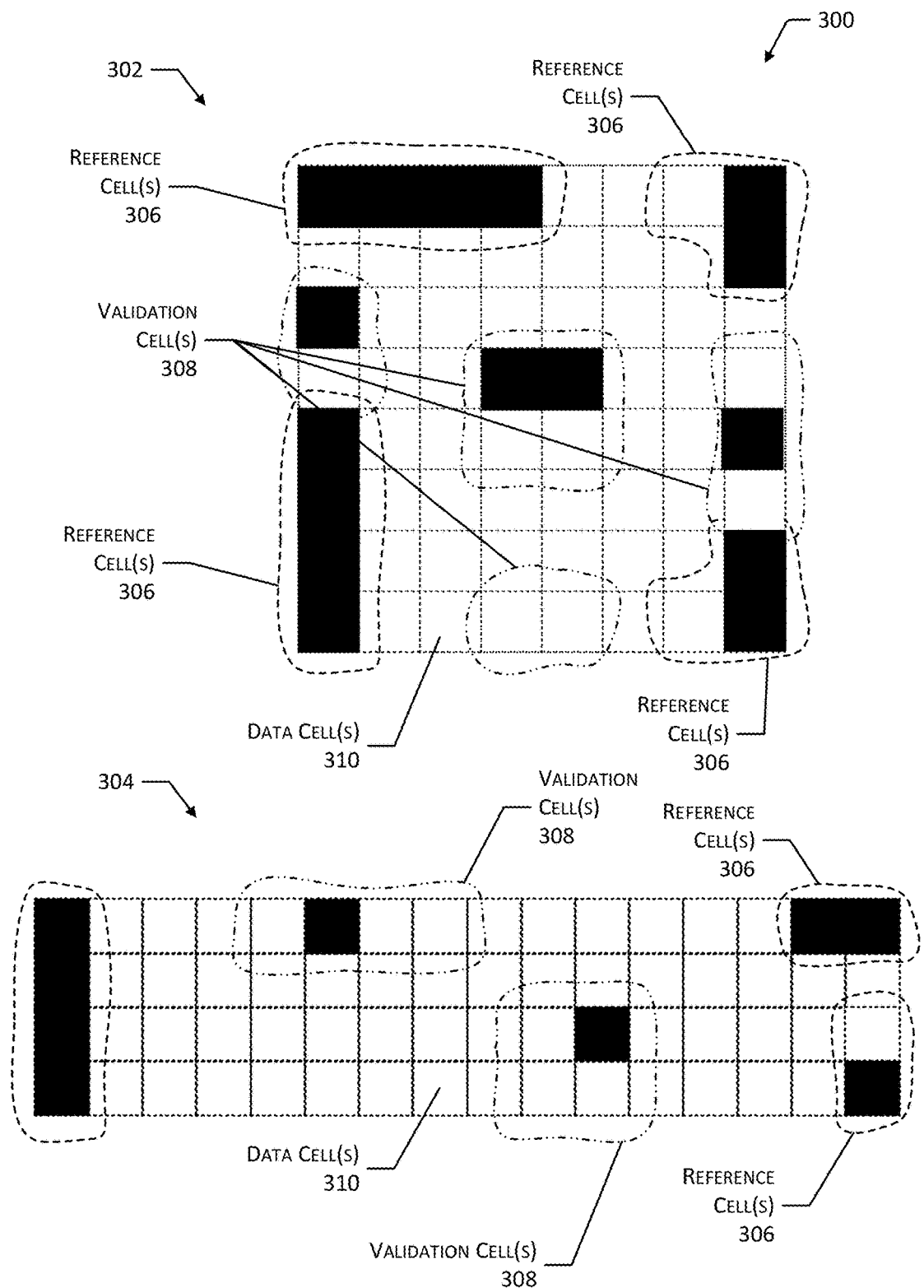
FIG. 3 illustrates the location of reference cells, validation cells, and data cells within a tag, according to some implementations.

The tag 104 may be rectangular having more columns than rows, such as shown in FIG. 3. In other implementations other arrangements of cells 202 may be used.

The marks 106 in this illustration are depicted as squares, but in other implementations the marks may have other shapes. For example, a mark 106 may comprise a circle or triangle that is within the boundaries of a particular cell 202. In some implementations the shape of the mark 106 may be used to indicate a particular cell value. For example, a triangle may be a binary 0 while a circle is a binary 1.

The tag depicted in FIG. 2 is representative of, or equivalent to, a two-dimensional (2D) matrix with the following values:

$$\begin{bmatrix} 1 & 1 & 1 & 1 & 0 & 0 & 0 & 1 \\ 0 & 1 & 0 & 0 & 1 & 0 & 0 & 1 \\ 0 & 0 & 0 & 0 & 0 & 1 & 0 & 0 \\ 0 & 0 & 1 & 0 & 0 & 0 & 1 & 0 \\ 1 & 1 & 1 & 0 & 0 & 0 & 0 & 1 \\ 1 & 1 & 1 & 0 & 1 & 1 & 0 & 0 \\ 1 & 0 & 0 & 0 & 1 & 0 & 0 & 1 \\ 1 & 0 & 1 & 1 & 1 & 0 & 0 & 1 \end{bmatrix} \quad \text{MATRIX 1}$$

FIG. 3 illustrates at 300 the location of reference cells, validation cells, and data cells within a tag, according to some implementations. In this illustration a first tag 104 is shown at 302 and a second tag is shown at 304.

The first tag 104 shown at 302 depicts an 8×8 arrangement of the three types of marks 106 that a tag 104 may comprise. A particular type is associated with a particular location within the arrangement of the tag. For example, a mark or cell at a specific row and column is associated with a particular function.

Reference cells 306 are used to designate the edges of the tag 104, and may also be used to determine orientation. For example, each corner of the tag 104 may be designated as a reference cell 306, and set to a particular cell value, such as a second cell value 306, or black. In some implementations several cells 202 along the perimeter of the tag 104 may be designated as reference cells 306. In comparison to other tags, the reference cells 306 may comprise less than the total number of cells 202 on a perimeter of the tag 104. For example, the first tag 104 shown at 302 has four black reference cells 306 extending from an upper left corner along a right edge of the tag 104. A black reference cell 306 is in the upper right corner, while a white and a black reference cell 306 are adjacent along opposite edges of the tag 104. Likewise, another trio of reference cells 306 is arranged in the lower right corner. Another group of four black reference cells 306 extends from the lower left corner upwards. This arrangement provides a black mark 106 at each corner, while providing a known asymmetry which may be used to determine the orientation of the mark 104 as depicted in the image data 110, or a corresponding matrix of cell values. As shown at 302, the reference cells 306 comprise 14 cells 202 within the tag 104, or 14 bits of the 64 bits that the tag 104 represents. In other implementations, other arrangements of reference cells 306 may be used.

Validation cells 308 are depicted. These marks 106 may be used to store data for error correction, error detection, and so forth. For example, the validation cells 308 may be used to store a hash value, error correction value, or other information that may be used to determine if the tag 104, or associated cell values, are valid. For example, validation cells 308 are depicted at various locations within the tag, such as along three edges and within a center of the tag 104. As shown at 302, the validation cells 308 comprise 11 cells, or 11 bits of the 64 bits that the tag 104 represents. In other implementations, other arrangements of validation cells 308 may be used.

Data cells 310 are used to encode the tag data 130. For example, the data cells 310 are used to encode the useful data or payload. As shown at 302, the data cells 310 comprise 39 cells, or 39 bits of the 64 bits that the tag 104 represents. In this arrangement, the data cells 310 comprise about 60 percent of the tag 104.

The allocation of data to particular cells within the tag 104 may not be sequential. For example, the tag data 130 may comprise 39 bits of data in a particular sequence. The association of a particular cell in the tag 104 with a particular position in the sequence may be non-sequential. For example, during configuration or specification of a tag 104 layout, each position in the sequence of tag data 130 may be randomly associated with a particular location in the tag 104. Placement of the data cells 310 non-sequentially may provide several advantages. For example, the non-sequential arrangement may improve error tolerance.

The second tag 104 shown at 304 depicts an alternative arrangement in which the tag 104 is a 16×4 arrangement of the three types of marks 106 that a tag 104 may comprise. This arrangement uses fewer reference cells 306 and fewer validation cells 308, with a corresponding increase in the number of data cells 310 available to encode data. With this arrangement, the data cells 310 comprise 48 bits, or 75 percent of the tag 104 at 304.

Figure 4:
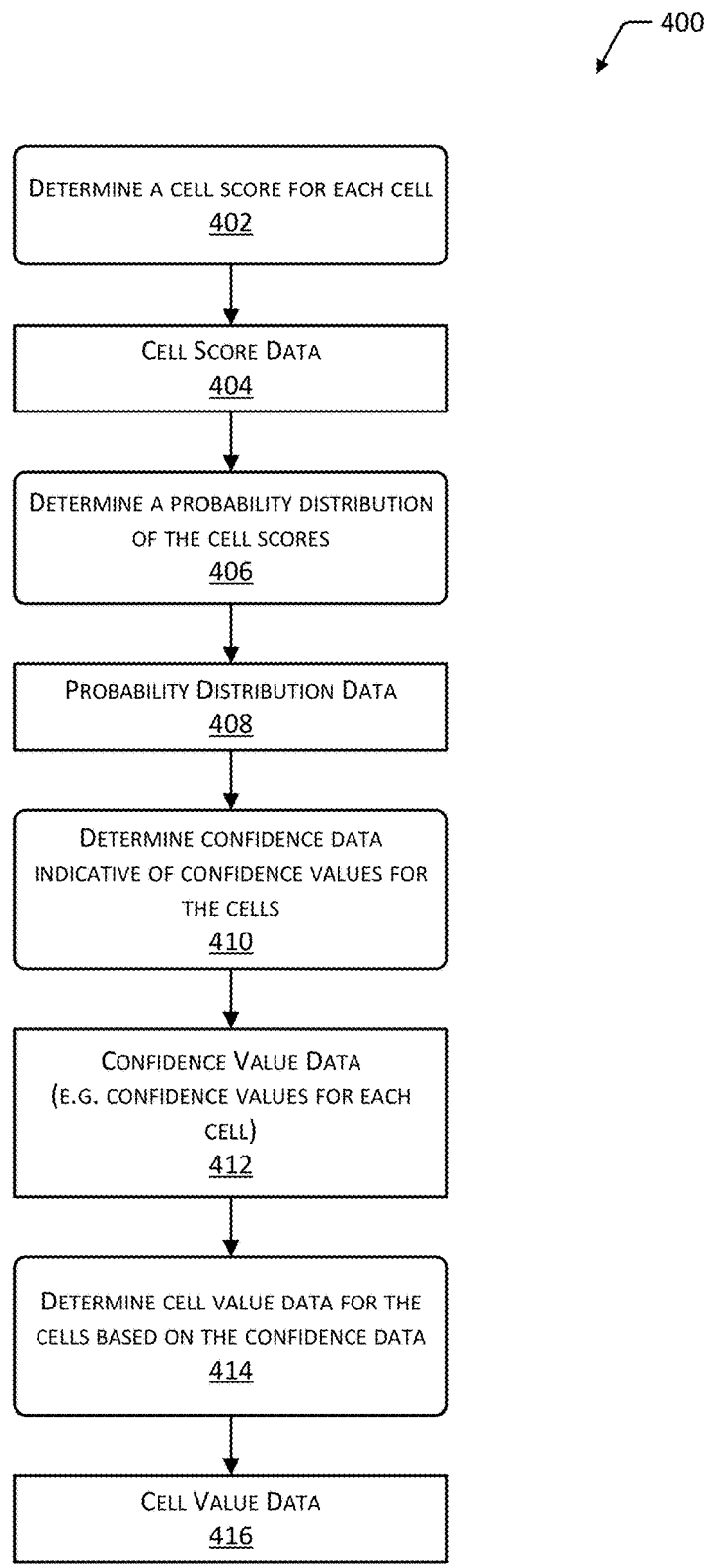
FIG. 4 is a flow diagram of a process to determine cell values, according to some implementations.

FIG. 4 illustrates a flow diagram 400 of a process to determine cell values, according to some implementations. The process may be implemented at least in part by the image processing module 114 executing at least in part on the computing device 112.

At 402, cell score data 404 is produced that comprises a cell score and is determined for each cell 202. The cell score for each cell 202 may be determined by convolving the pixel values in the rectified patch data. In one implementation a Gaussian filter may be used to convolve the pixel values in each of the respective cells 202 as indicated by the designated cell boundaries. This filter has the effect of applying greater weight to the pixel values in the center of the cell 202 and less weight to the pixel values near the perimeter of the cell 202. In other implementations, other filters or techniques may be used.

At 406, the cell score data 404 is processed to determine probability distribution data 408. The probability distribution data 408 includes a different model for each possible cell value that the tag 104 may include to encode data. For example, the tag 104 as described in FIG. 2 may include a first cell value 204 (white) and a second cell value 206 (black). Thus, the probability distribution data 408 would be indicative of two different models, one for white and one for black.

In one implementation the models may be Gaussian. For example, a first model for the second cell value 206 (black) may involve a Gaussian model being initialized with the highest cell score found in the cell score data 404. The lowest cell score is then found in the cell score data 404 and used to initialize a second model for the first cell value 204 (white). The process may continue, iterating to the next highest and next lowest scores being added to the respective models. The mean and variance of each model is updated accordingly. The resulting Gaussian models comprise the probability distribution data 408.

At 410, confidence value data 412 comprising the confidence values for each of the cells 202 is determined. The cell score data 404 may be processed using the models expressed in the probability distribution data 408 that the cell is representative of either a first cell value 204 or a second cell value 206. The confidence value data 412 may be based on a first probability value and a second probability value. For example, the confidence value data 412 may be calculated using the following equation:

$$\text{Confidence value of a cell} = \log\left\{\frac{P1(x)}{P2(x)}\right\}$$

where x is the cell score for a particular cell, P1 is a first probability value obtained using a first model indicative of a probability that the cell is white given the value of x, and P2 is a second probability value obtained using a second model indicative of a probability that the cell is black given the value of x.

Equation 1

At 414, cell value data 416 is determined based on the confidence value data 412. The cell value data 416 comprises data that is indicative of a cell value for each cell. The determination may comprise comparing the confidence value for each cell with a threshold value. For example, if the confidence value is a positive number, the cell 202 may be designated as having a cell value of 1. Continuing the example, if the confidence value is not a positive number, the cell 202 may be designated as having a cell value of 0.

The cell value data 416 now expresses a binary matrix representation of the tag. The cells 202 in the tag 104 are each associated with a single one of the cell values that are possible. Each cell value is also associated with a particular confidence value, as stored in the confidence value data 412.

Figure 5:
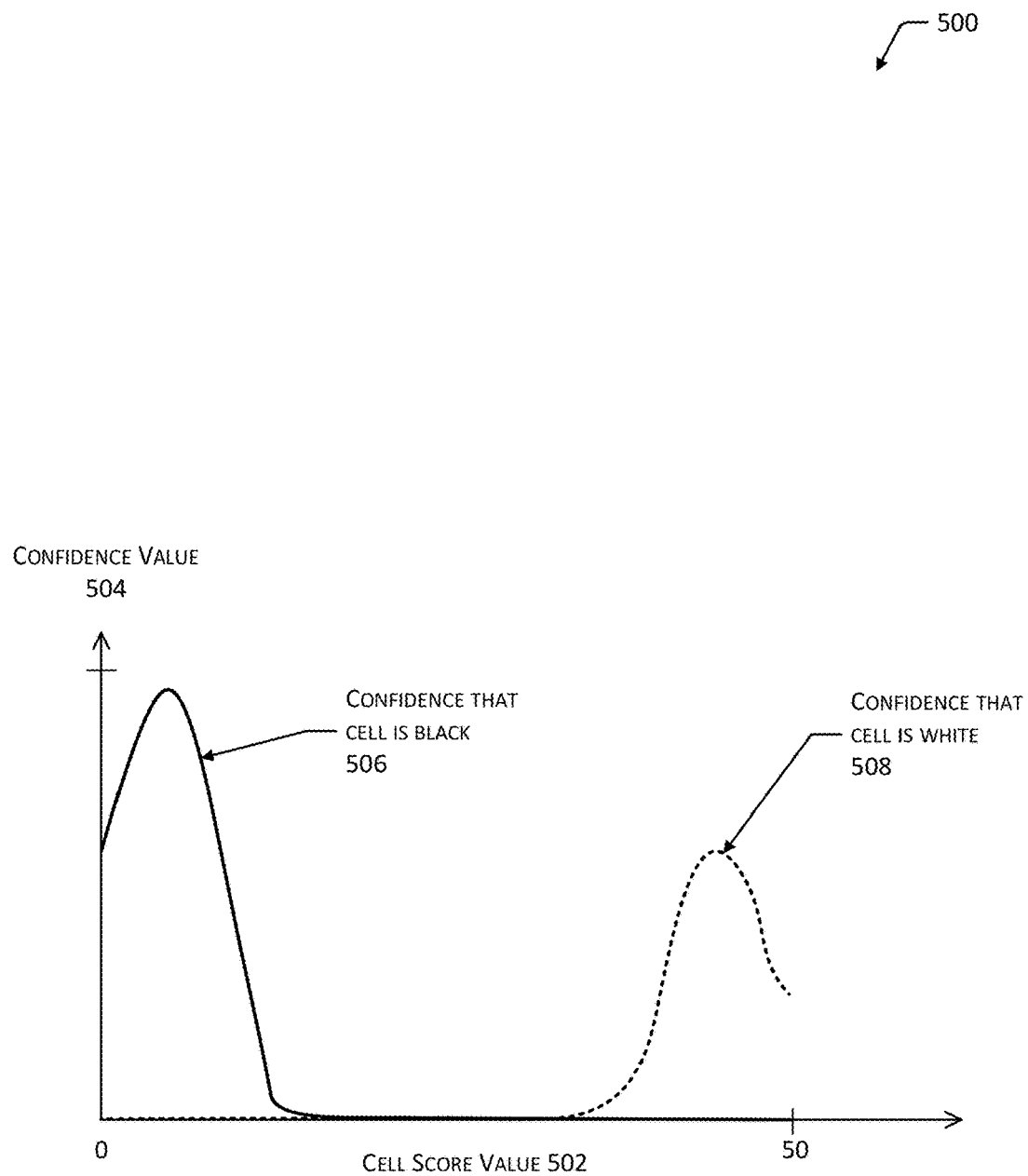
FIG. 5 illustrates a graph of a probability distribution function associated with the value of a cell, according to some implementations.

FIG. 5 illustrates a graph 500 of a probability distribution associated with the value of a cell score, according to some implementations. As described above, cell score data 404 indicative of cell scores may be determined and used to generate probability distribution data 408. In this illustration, a horizontal axis 502 indicates cell score values while a vertical axis 504 indicates a confidence value. A first curve is indicative of a confidence that a cell is black 506 while a second curve is indicative of a confidence that a cell is white 508. Given an input of a cell score value 502, such as described above, a confidence value 504 or probability is provided as output.

By using the probability distribution data 408, the system is more tolerant of various changes in environment, tag quality, illumination, artifacts introduced due to data processing, and so forth. For example, a predetermined hard limit that specifies that a white cell 202 is one that has an 8-bit intensity value greater than 192 may experience problems with readout in the event that there is a change in illumination or exposure time on the camera. In comparison, by using the probability distribution data 408, the system is more robust and able to operate under varying conditions.

Figure 6:
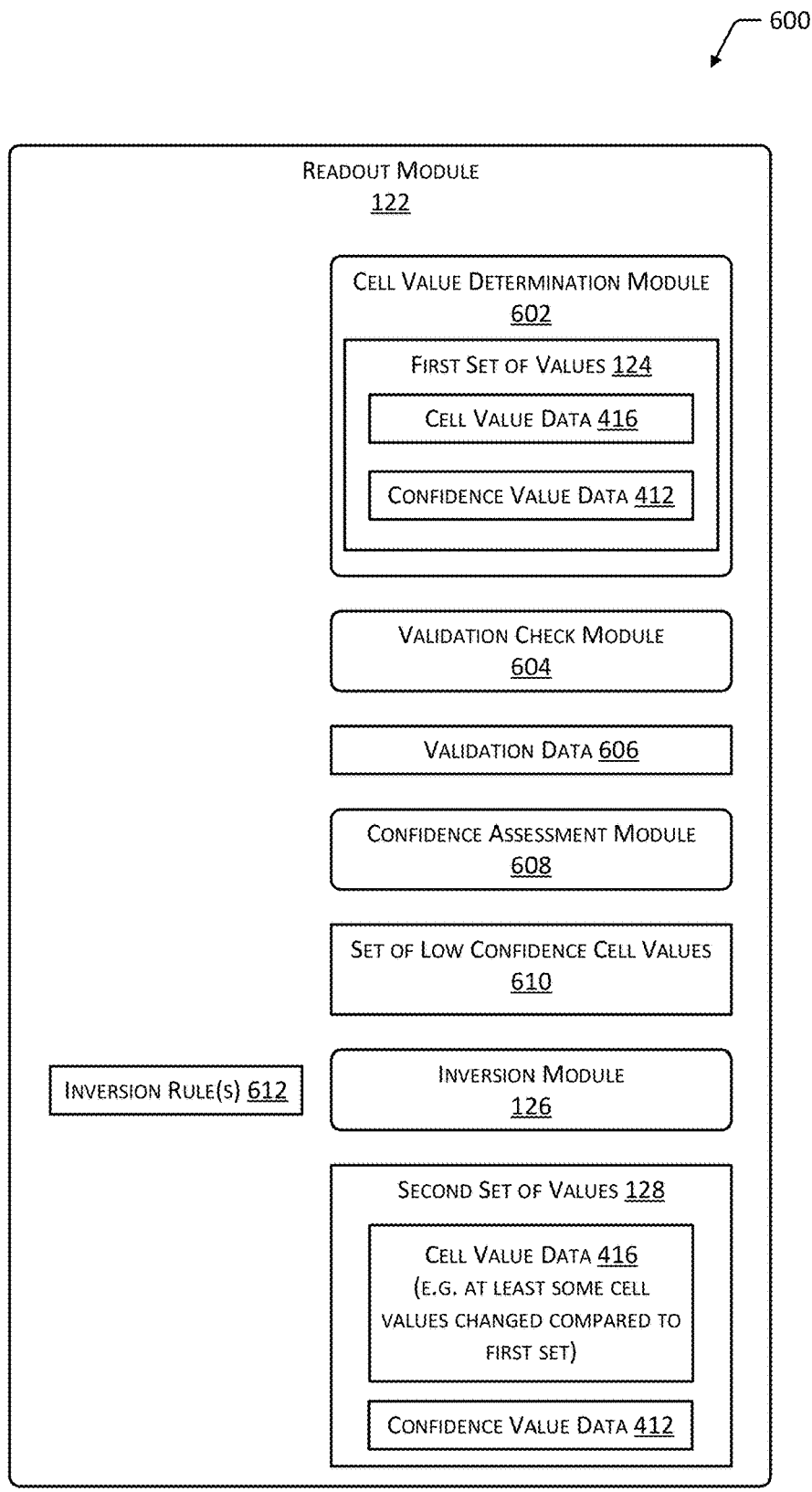
FIG. 6 is a block diagram of a readout module that utilizes an inversion module to change one or more of the cell values, according to some implementations.

FIG. 6 is a block diagram 600 of the readout module 122, according to some implementations. The readout module 122 may include one or more of a cell value determination module 602. The cell value determination module 602 may implement the process described above with regard to FIG. 4 to determine a first set of values 124. The first set of values 124 may comprise cell value data 416 and associated confidence value data 412. For example, the first set of values 124 may comprise cell values for particular cells 202 and their confidence values.

A validation check module 604 is configured to perform one or more validation checks on a set of cell values that are provided as input. The validation check module 604 may implement one or more different validation checks. For example, the validation check module 604 may use a hash function to process at least some of the cell values in the set of cell values and generate a hash value. The hash value may then be compared to a previously stored value, or to a value that is encoded by the cell values of another portion the elements in the matrix. For example, the hash value may be encoded on the tag 104 using one or more of the validation cells 308. The validation check module 604 may utilize a cyclic redundancy check (CRC), a checksum, an XOR table, and so forth. The validation check module 604 may produce validation data 606 that is indicative of whether the cell values of the first set of values 124, or a portion thereof, that was checked is valid or not. For example, the validation data 606 may comprise a binary value representative of a yes or a no.

If the validation data 606 indicates that the first set of values 124 is valid, the tag data 130 may be generated from the first set of values 124. For example, the data encoded by the data cells 310 may be output as the tag data 130.

If the validation data 606 indicates that the first set of values 124 is not valid, a confidence assessment module 608 may be used. The confidence assessment module 608 is configured to determine a set of low confidence cell values 610. For example, the confidence assessment module 608 may sort the first set of values 124 by the confidence value data 412. The confidence assessment module 608 may determine, based on a threshold value, the set of low confidence cell values 610. For example, the confidence assessment module 608 may be configured to generate a set of the ten cell values with the lowest confidence value. The threshold value for selection of the set of low confidence cell values 610 may be a set value count (such as the 10 lowest), a percentage, a percentile, a specified minimum confidence value, and so forth.

The inversion module 126 accepts as input a set of cell values and the set of low confidence cell values 610. For example, the first set of values 124 and the set of low confidence cell values 610 may be provided as input to the inversion module 126 after the determination that the validation data 606 indicates invalidity.

The inversion module 126 is configured to change the cell values of one or more of the cell values indicated by the set of low confidence cell values 610 according to one or more inversion rules 612. The inversion rules 612 specify one or more techniques that are used to change one or more of the cell values in the first set of values 124 to create a second set of values 128.

In one implementation, the inversion rule 612 may indicate that the threshold value used by the confidence assessment module 608 to select the set of low confidence cell values 610 is N (where N is a positive integer) of the least confident cell values that are designated as data cells 310. The inversion rule 612 may specify k cell values to invert, where k is a value from 0 to N. For example, there are $2^N$ possible combinations of bits when the cell value is binary. A combination score may be determined for each of the combinations. The combination score may be based on the confidence values associated with the cell values. For example, the combination score may comprise the mean of the confidence values of the bits in the particular combination. In another example, the combination score may comprise the sum of the confidence values of the bits in the particular combination. The combinations may then be sorted by the combination score. The combinations may then be tested, in order of the combination score, until a depth D is reached, where D is less than $2^N$. Each combination may be tested by the validation check module 604. If the resulting validation data 606 indicates a valid code, the process may stop, and the combination is used to generate the tag data 130. If the resulting validation data 606 indicates an invalid code, the remaining combinations are tested until the depth D is reached.

Figure 8:
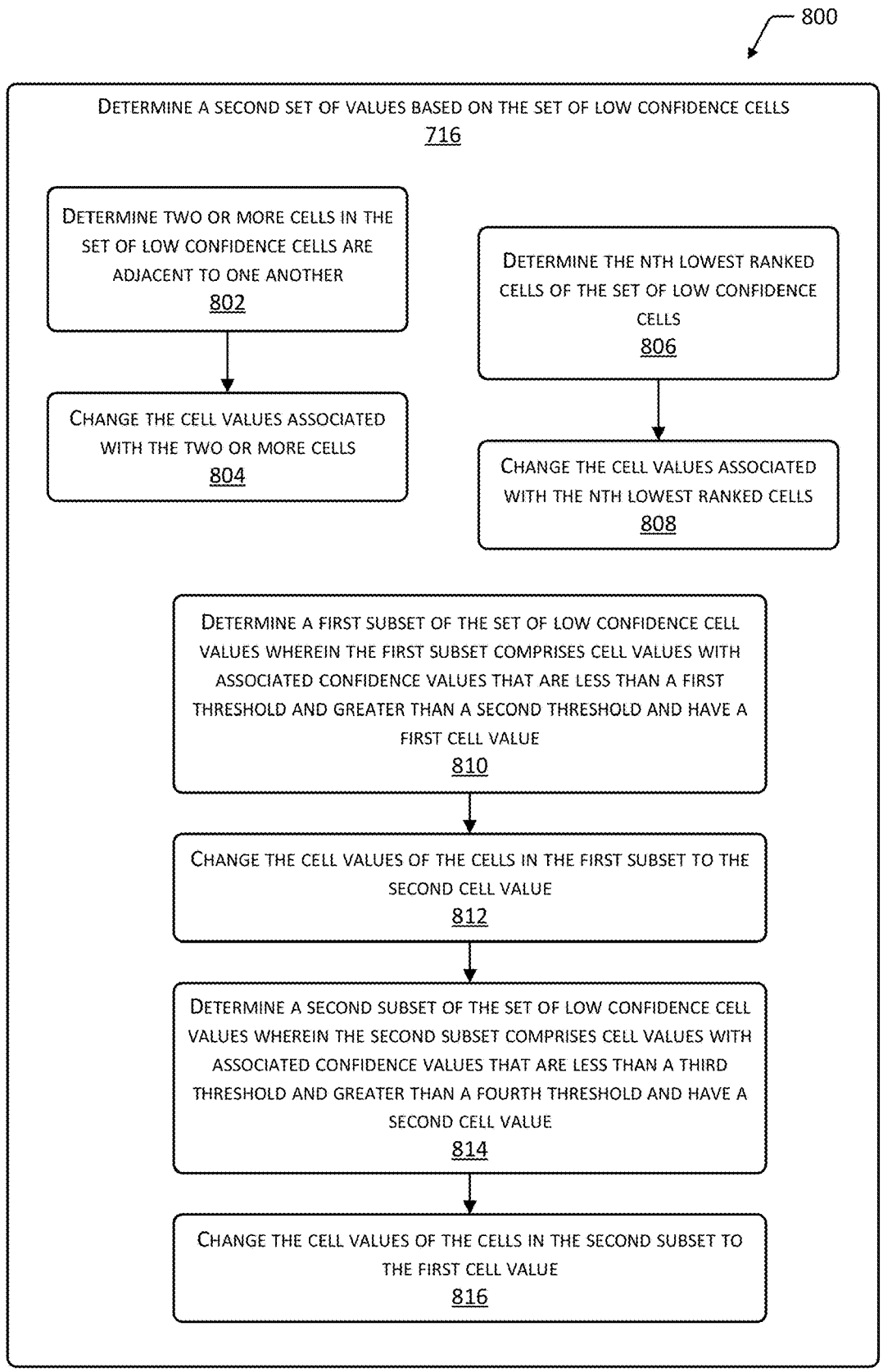
FIG. 8 illustrates a flow diagram of various techniques to determine which cells will have cell values changed, according to some implementations.

In other implementations, other inversion rules 612 may be utilized. FIG. 8 below depicts processes that implement the inversion rules 612.

By using this technique, the readout module 122 is able to quickly and efficiently tolerate errors and produce usable tag data 130.

Figure 7:
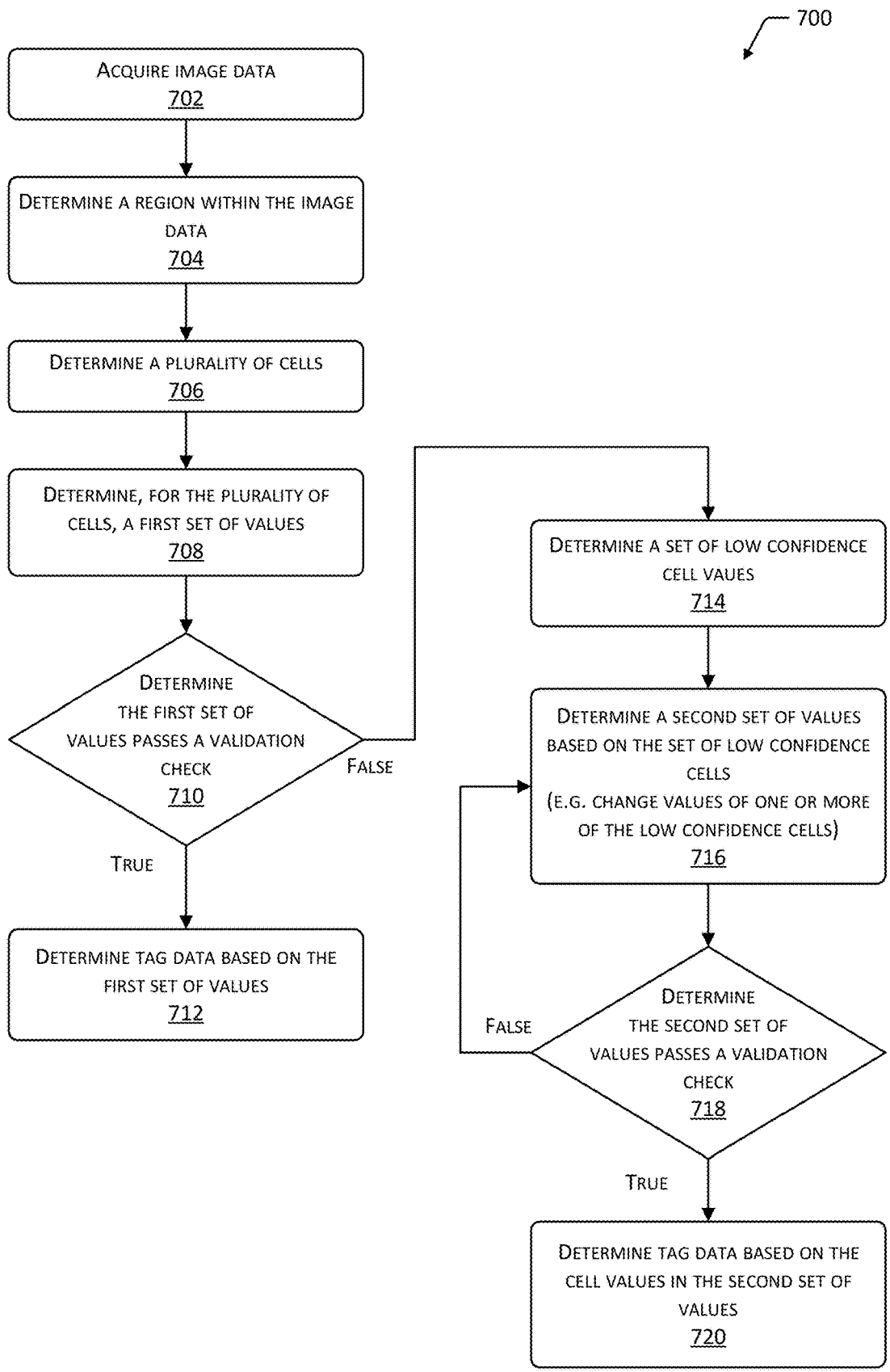
FIG. 7 illustrates a flow diagram of a process to determine tag data by changing one or more low confidence cell values, according to some implementations.

FIG. 7 illustrates a flow diagram 700 of a process to determine tag data by changing one or more low confidence cell values, according to some implementations. The process may be implemented by the image processing module 114.

At 702 image data 110 is acquired. For example, a camera 108 may be used to obtain an image of a tag 104 on an item 102.

At 704 a region within the image data 110 is determined to possibly contain a tag 104. For example, the image data 110 may be processed by the locate module 116 using a sliding window to determine patch data 118 indicative of a region that has a variability metric that exceeds a threshold value. The determination of the variability metric is described with regard to FIG. 9. In another implementations, other techniques may be used to determine the region that possibly contains a tag 104 such as using a histogram of ordered gradients to assess the intensity values of pixels, and so forth.

At 706 a plurality of cells is determined within the patch data 118. For example, if the image processing module 114 has been configured to process an 8×8 grid of marks 106, the patch data 118 is segmented into an 8×8 array.

At 708 a first set of values 124 are determined for the plurality of cells. For example, the process described in FIG. 4 may be used to determine the first set of values 124.

At 710 cell values in the first set of values 124 are tested with a validation check. For example, the validation check module 604 may determine one or more hash values based on the first set of values 124. If the first set of values 124 pass the validation check, the process proceeds to 712. At 712 the tag data 130 is determined based on the first set of values 124. If the first set of values 124 fails the validation check, the process proceeds to 714.

At 714 a set of low confidence cell values 610 are determined. For example, the confidence assessment module 608 may determine a set of low confidence cell values 610 that comprises the cell values associated with the N lowest confidence values, where N is a positive integer.

At 716 a second set of values 128 is determined based on the set of low confidence cell values 610 and the first set of values 124. For example, the inversion module 126 may invert the cell values of one or more of the cells in the set of low confidence cell values 610.

At 718 the second set of values 128 are tested with the validation check. This may be the same validation check as used at 710, or a different validation check. If the second set of values 128 passes the validation check, the process proceeds to 720. At 720 the tag data 130 is determined based on the cell values in the second set of values 128. If the second set of values 128 fails the validation check, the process returns to 716 and determines another set of cell values, which are then tested again.

Data indicative of the number of different sets of cell values with different bit combinations that are tested before the validation check is successful may be maintained. This data indicative of the number of combinations of cell values that were tested may be included in the tag data 130. For example, if nine different combinations of cell values were tested before a combination was found that passed the validation check, the tag data 130 may include information indicative of the number of combinations. This information may be used by subsequent systems to determine a confidence of the tag data 130.

In some implementations, after failure of the first validation check at 710, the process may generate multiple sets of cell values, each with a different combination of inverted low confidence cells. A combination score may be determined for each set of cell values that represents a particular combination. For example, the combination score may comprise the mean of the confidence values of the cell values in the particular combination. The combination scores may be used to rank the sets of cell values. For example, the set of cells with the highest combination score may be tested first, following by the next highest combination score, and so forth. The first set of values with cell values that pass the validation check may then be used to generate the tag data 130. Various techniques to determine the second set of cell values are discussed in FIG. 8.

In some implementations the tag data 130 may comprise information indicative of the number of cell values that were changed to pass the validation check. For example, a determination may be made of the number of cell values that differ between the first set of values 124 and the second set of values 128 that passed the validation check. This information may be used by subsequent systems to determine a confidence of the tag data 130.

FIG. 8 illustrates a flow diagram 800 of various techniques to determine which cells 202 will have cell values changed, according to some implementations.

In one implementation low confidence cells corresponding to marks 106 that are adjacent to one another in the tag 104 may be inverted as a group. As shown at 802, two or more cells in the set of low confidence cell values 610 are determined to be adjacent to one another in the tag 104. For example, cells may be determined to be adjacent to one another when their coordinates within a matrix are consecutive.

At 804 the cell values associated with the group of two or more cells are changed from a first value to a second value. In one implementation, individual cell values within the group may be inverted individually. In another implementation, all cell values within the group may be changed to a single common value.

In another implementation cell values may be changed based on the ranking of their confidence values. At 806, the Nth lowest ranked cells of the set of low confidence cell values 610 are determined, where N is a positive integer greater than zero. For example, the ten lowest ranked cell values of the set of low confidence cell values 610 may be determined by sorting the set of low confidence cell values 610.

At 808 the cell values associated with the Nth lowest ranked cells are changed. In one implementation, individual cell values within the Nth lowest ranked cells may be inverted individually or in combinations. In another implementation, all cell values within the Nth lowest ranked cells may be inverted.

In another implementation, cell values may be changed preferentially. For example, it may be desirable to have the system tend to be more likely to change cell values from a second value to a first value than from a first value to a second value.

At 810 a first subset of the set of low confidence cell values 610 is determined. The first subset may comprise those cell values with associated confidence values that are less than a first threshold and greater than a second threshold and have a first cell value. For example, the first subset may comprise the black cells in the set of low confidence cell values 610 that have confidence values between 0.01 and 0.3.

At 812 the cell values of the cells in the first subset are inverted. For example, the black cells in the first subset are changed to white cells.

At 814 a second subset of the set of low confidence cell values 610 is determined. The second subset may comprise those cell values with associated confidence values that are less than a third threshold and greater than a fourth threshold and have a second cell value. For example, the second subset may comprise the white cells in the set of low confidence cell values 610 that have confidence values between 0.25 and 0.4.

At 816 the cell values of the cells in the second subset are inverted to a second value. For example, the black cells in the second subset are changed to white cells. In some implementations the range specified by the first threshold and second threshold may overlap within the range specified by the third threshold and the fourth threshold.

While the examples above are given with regard to inverting binary values, the techniques described may be applied to multi-value marks. For example, if the marks comprise different colors to encode more than two possible cell values, instead of inverting the cell values may be changed.

In some implementations the system may be configured to only invert those cell values associated with particular types of marks 106. For example, only those cell values associated data cells 310 may be changed. In another example, the cell values associated with data cells 310 and validation cells 308 may be changed. Cell values associated with reference cells 306 may be excluded from being changed.

The techniques described above involving the changing of values are described with respect to tags 104 that are read optically. However, it is understood that these techniques may be applied to other types of tags 104. For example, the tag 104 may comprise an array of marks made with a ferromagnetic ink. In another example, the tags 104 may comprise radio frequency identification (RFID), near field communication (NFC), acoustic, or other tags 104 that transmit data electromagnetically or acoustically. The received data may be tested for validity, and if invalid, confidence values may be used to determine which of the received values to change.

Figure 9:
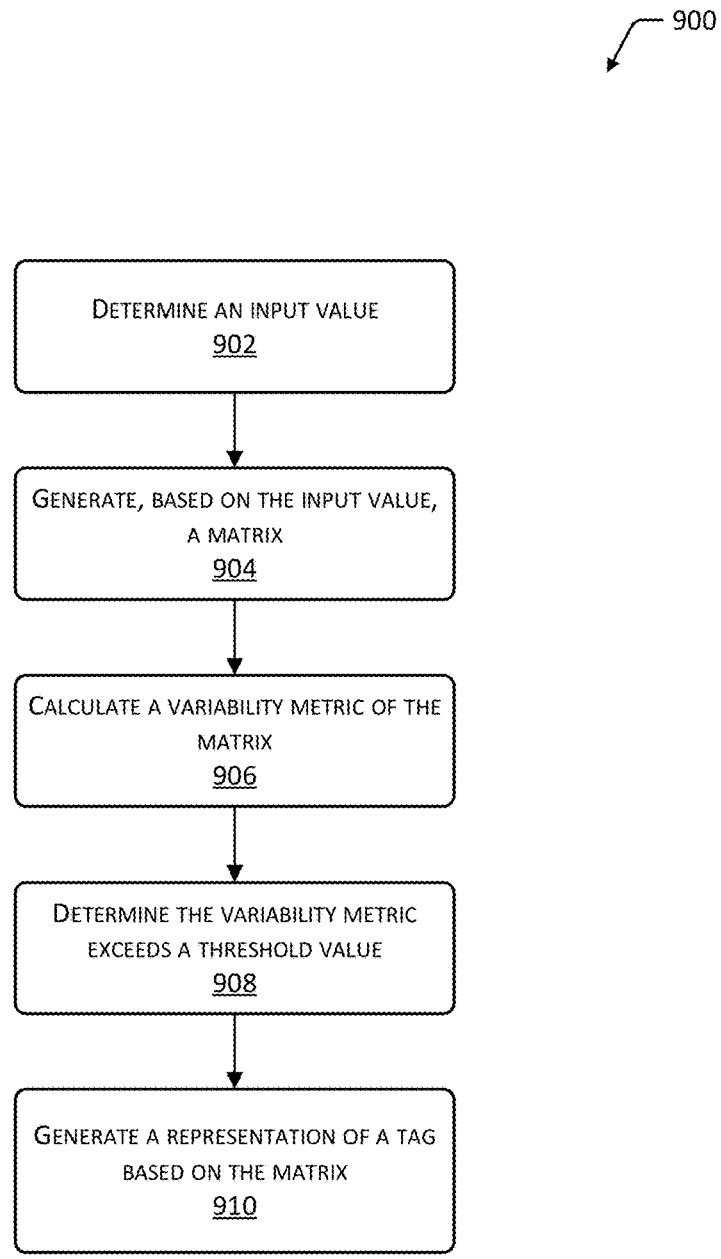
FIG. 9 illustrates a flow diagram of a process to generate a tag that exhibits a minimum variability metric, according to some implementations.

FIG. 9 illustrates a flow diagram 900 of a process to generate a tag 104 that exhibits a minimum variability metric, according to some implementations.

At 902 an input value is determined. For example, the input value may comprise a sequentially generated number. In another implementation, the input value may comprise particular data that is to be encoded, such as a string or numeric value.

At 904, based on the input value, a matrix is generated. For example, the matrix may have two dimensions. Each element in the matrix may be representative of one or more bits. For example, each element may be a single bit value, representing either a "1" or a "0".

At 906 a variability metric of the matrix is calculated. In one implementation, the variability metric may be calculated by iteratively processing the matrix with a sliding window technique to determine variability between adjacent marks. For a currently selected element of the matrix and the one or more elements adjacent to that element, a difference between a value of the at least one element and a value of the adjacent element is determined. An absolute value of the difference is then determined. A sum of the absolute values of the differences for the cells that are adjacent to the currently selected cell is calculated. A sum of the sum of the absolute value of the differences is then determined. This sum may then be multiplied by a normalization factor to determine the variability metric.

This may be expressed in the following equation:

$$\frac{1}{K} \sum_{(p,q) \in N} |T_p - T_q|$$

where, Tp is the cell value of the selected cell, Tq is the cell value of a neighboring cell, N is the set of neighboring pairs of cell values (such as left, right, above, and below) and K is the normalization factor that is equal to (M×N×O), where M is the number of rows in the matrix, N is the number of columns in the matrix, and O is the number of neighbors considered (such as 4 in the case of left, right, above, and below).

Equation 2

At 908 the variability metric is determined to exceed a threshold value. For example, a variability metric that is greater than 0.4 may be deemed sufficiently variable for use. In comparison, a matrix that exhibits a variability metric that is less than 0.4 may be deemed too degenerate for later use. For example, a tag 104 with insufficient variability may not be properly located within the image data 110. A matrix that has a variability metric below the threshold value may be discarded or flagged as unusable.

At 910 a representation of a tag 104 based on the matrix is generated. For example, the representation may comprise a set of instructions that, when processed by a printer, produce the tag 104. In another example, the representation may comprise image data, such as a bitmap or vector graphic.

As described elsewhere, the variability metric may also be used to determine if a portion of an image is likely to include a tag 104. For example, a region of the image data 110 may be processed to determine the variability metric of that region. If the variability metric is greater than the threshold, the region may be deemed likely to contain a tag 104.

In other implementations, other techniques may be used to generate representations of tags 104 that contain a minimum level of variability.

Figure 10:
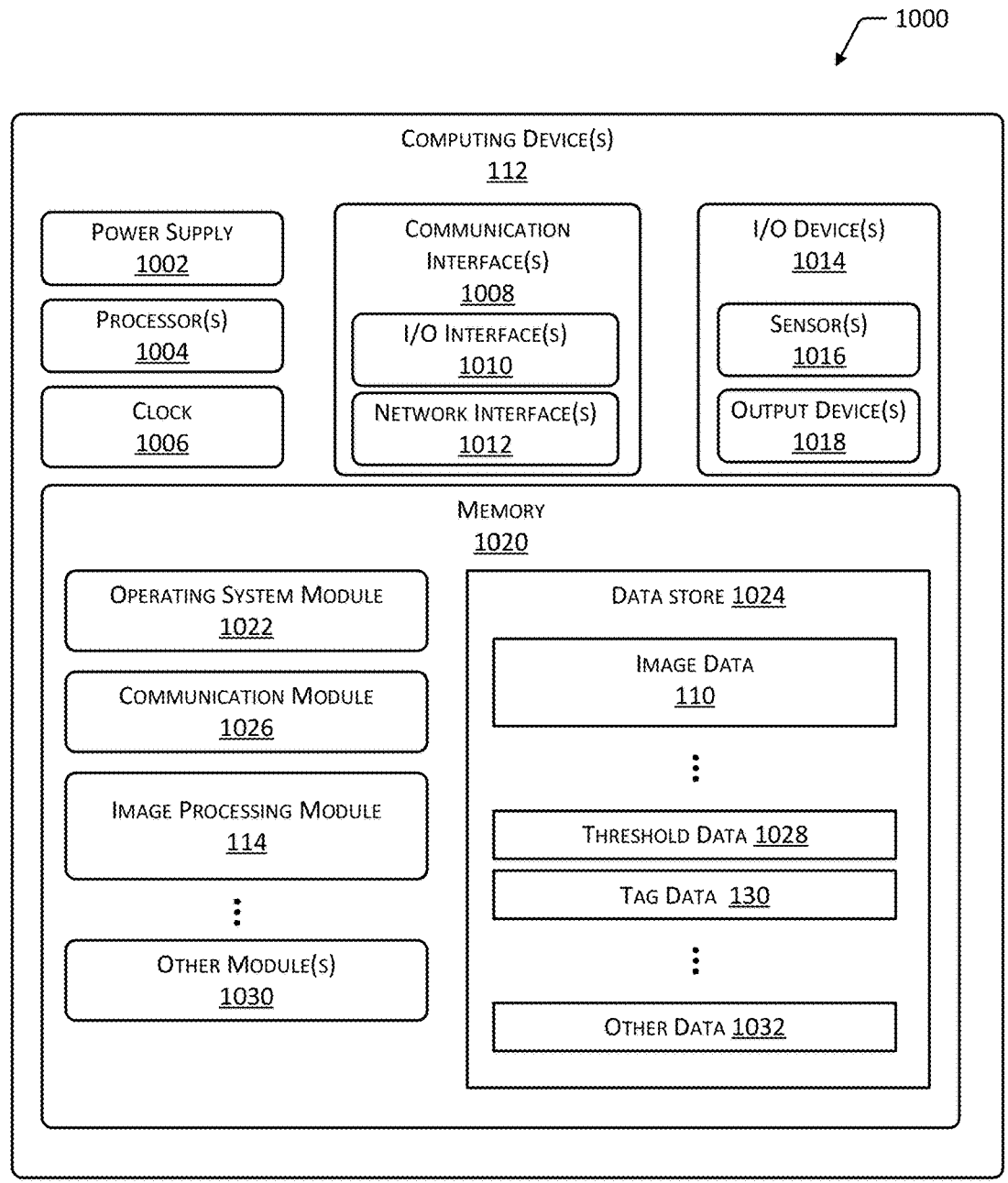
FIG. 10 is a block diagram of a computing device to generate tag data from an image of a tag, according to some implementations.

FIG. 10 illustrates a block diagram 1000 of the computing device 112 configured to implement the image processing module 114, according to some implementations. The computing device 112 may be physically present at a facility, may be accessible by a network, or a combination of both.

One or more power supplies 1002 may be configured to provide electrical power suitable for operating the components in the computing device 112. The one or more power supplies 1002 may comprise batteries, capacitors, fuel cells, photovoltaic cells, wireless power receivers, conductive couplings suitable for attachment to an external power source such as provided by an electric utility, and so forth. The computing device 112 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The computing device 112 may include one or more communication interfaces 1008 such as input/output (I/O)

interfaces 1010, network interfaces 1012, and so forth. The communication interfaces 1008 enable the computing device 112, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include input devices such as one or more of a sensor 1016, keyboard, mouse, scanner, and so forth. For example, the sensor 1016 includes the camera 108. The I/O devices 1014 may also include output devices 1018 such as one or more of a display device, printer, audio speakers, and so forth. In some embodiments, the I/O devices 1014 may be physically incorporated with the computing device 112 or may be externally placed.

The network interfaces 1012 may be configured to provide communications between the computing device 112 and other devices, routers, access points, and so forth. The network interfaces 1012 may include devices configured to couple to personal area networks (PANS), local area networks (LANs), wireless local area networks (WLANS), wide area networks (WANs), and so forth. For example, the network interfaces 1012 may include devices compatible with Ethernet, Wi-Fi, Bluetooth, ZigBee, and so forth.

The computing device 112 may also include one or more buses or other internal communications hardware or software that allow for the transfer of data between the various modules and components of the computing device 112.

As shown in FIG. 10, the computing device 112 includes one or more memories 1020. The memory 1020 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1020 provides storage of computer-readable instructions, data structures, program modules, and other data for the operation of the computing device 112. A few example functional modules are shown stored in the memory 1020, although the same functionality may alternatively be implemented in hardware, firmware, or as a system on a chip (SoC).

The memory 1020 may include at least one operating system (OS) module 1022. The OS module 1022 is configured to manage hardware resource devices such as the I/O interfaces 1010, the I/O devices 1014, the communication interfaces 1008, and provide various services to applications or modules executing on the processors 1004. The OS module 1022 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1020 may be a data store 1024 and one or more of the following modules. These modules may be executed as foreground applications, background tasks, daemons, and so forth. The data store 1024 may use a flat file, database, linked list, tree, executable code, script, or other data structure to store information. In some implementations, the data store 1024 or a portion of the data store 1024 may be distributed across one or more other devices including servers, network attached storage devices, and so forth.

A communication module 1026 may be configured to establish communications with sensors 1016, display devices 1018, servers, or other devices. The communications may be authenticated, encrypted, and so forth.

The memory 1020 may store an image processing module 114 that is configured to generate tag data 130 based on image data 110 obtained from the camera 108.

Information used by the image processing module 114 may be stored in the data store 1024. For example, the data store 1024 may store the image data 110, threshold data 1028, tag data 130, so forth.

Other modules 1030 may also be present in the memory 1020 as well as other data 1032 in the data store 1024.

Figure 11:
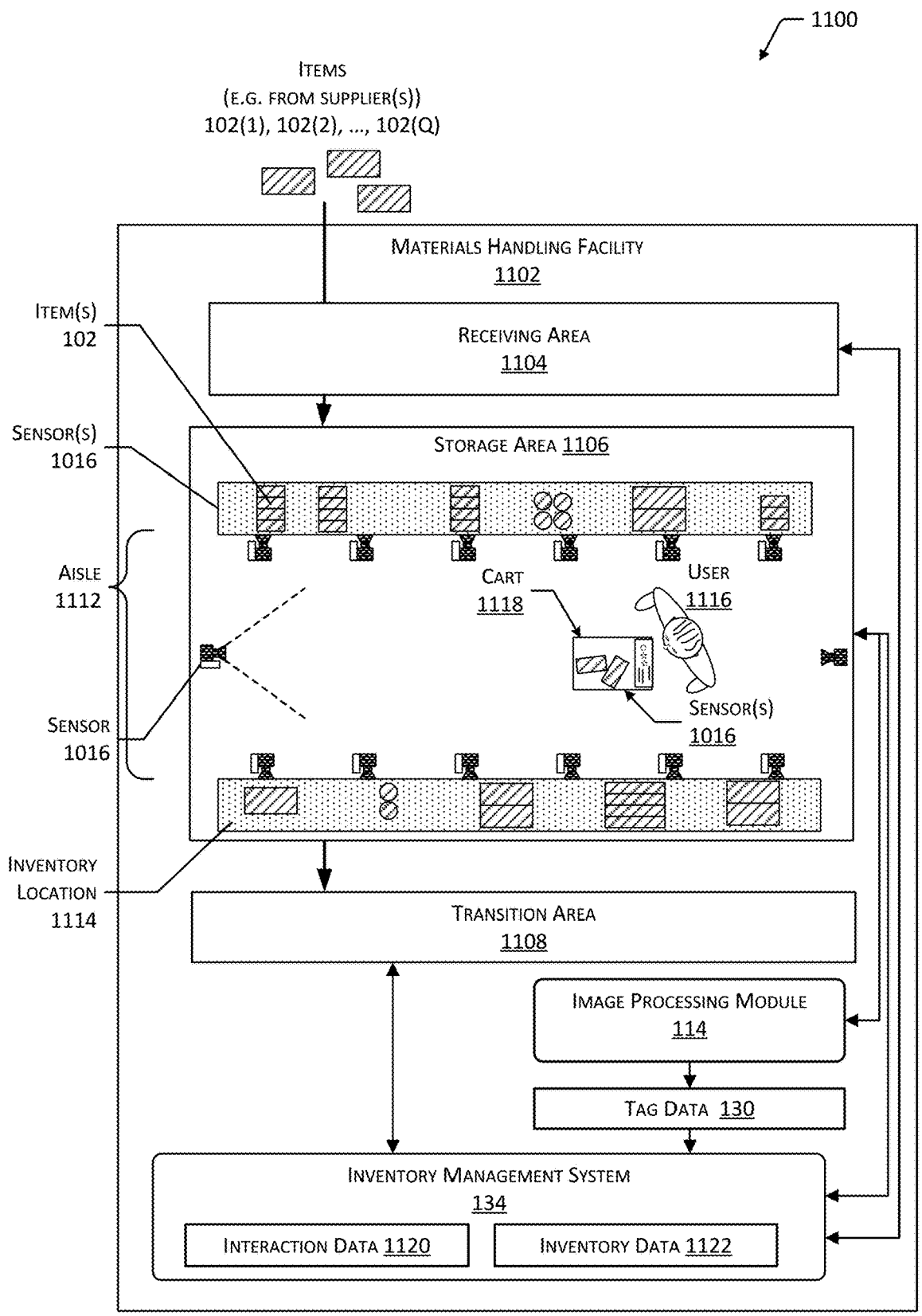
FIG. 11 is a block diagram illustrating a materials handling facility (facility) using the system, according to some implementations.

FIG. 11 is a block diagram 1100 illustrating a materials handling facility (facility) 1102 using the system 100, according to some implementations. A facility 1102 comprises one or more physical structures or areas within which one or more items 102(1), 102(2), . . . , 102(Q) may be held. As used in this disclosure, letters in parenthesis such as "(Q)" indicate an integer value greater than or equal to zero. The items 102 may comprise physical goods, such as books, pharmaceuticals, repair parts, electronic gear, and so forth.

The facility 1102 may include one or more areas designated for different functions with regard to inventory handling. In this illustration, the facility 1102 includes a receiving area 1104, a storage area 1106, and a transition area 1108.

The facility 1102 may be configured to receive different kinds of items 102 from various suppliers and to store them until a customer orders or retrieves one or more of the items 102. A general flow of items 102 through the facility 1102 is indicated by the arrows of FIG. 11. Specifically, as illustrated in this example, items 102 may be received from one or more suppliers, such as manufacturers, distributors, wholesalers, and so forth, at the receiving area 1104. In various implementations, the items 102 may include merchandise, commodities, perishables, or any suitable type of item 102, depending on the nature of the enterprise that operates the facility 1102. Upon being received from a supplier at the receiving area 1104, the items 102 may be prepared for storage in the storage area 1106. For example, in some implementations, items 102 may be unpacked or otherwise rearranged. The receiving area 1104 may be configured to accept items 102, such as from suppliers, for intake into the facility 1102. For example, the receiving area 1104 may include a loading dock at which trucks or other freight conveyances unload the items 102. After arriving through the receiving area 1104, items 102 may be stored within the storage area 1106. In some implementations, like items 102 may be stored or displayed together in the inventory locations 1114 such as in bins, on shelves, hanging from pegboards, and so forth. In this implementation, all items 102 of a given kind are stored in one inventory location 1114. In other implementations, like items 102 may be stored in different inventory locations 1114. For example, to optimize retrieval of certain items 102 having frequent turnover within a large physical facility 1102, those items 102 may be stored in several different inventory locations 1114 to reduce congestion that might occur at a single inventory location 1114.

In some implementations, the items 102 may be processed, such as at the receiving area 1104, to generate item data. For example, an item 102 may be weighed, imaged or otherwise scanned to develop reference images or representations of the item 102 at the receiving area 1104. In some implementations, the tag 104 on the item 102 may be read to identify the type of item during the receiving process. In one implementation, the items 102 may have the tags 104 applied in the receiving area 1104. In another implementation, the tags 104 may be applied by the manufacturer of the item 102, at a transshipment point, and so forth, and the items 102 may arrive with the tags 104 already applied.

The item data provides information about the characteristics of a particular type of item 102. These characteristics may include weight of the item 102 individually or in aggregate. For example, the item data may comprise information indicative of tag data 130 associated with an item 102, a weight of a single item 102, or a package, kit, or other grouping considered to be a single item 102. Other information such as weight distribution may also be stored.

The tag data 130 may include an item identifier. The item identifier may be used to distinguish one type of item 102 from another. For example, the item identifier may include a stock keeping unit (SKU) string, Universal Product Code (UPC) number, and so forth. The items 102 that are of the same type may be referred to by the same item identifier. For example, cans of beef flavor Brand X dog food may be represented by the item identifier value of "9811901181". In other implementations, non-fungible items 102 may each be provided with a unique item identifier, allowing each to be distinguished from one another.

The item data may include data about other characteristics, such as information about appearance for use in machine vision or manual recognition. For example, the item data may include sample images of the type of item 102, three-dimensional point cloud data for the item 102, and so forth. The sample image data may comprise one or more images of one or more of that type of item 102. For example, sample image data may be obtained during processing or intake of the item 102 to be used by the facility.

The item data may include other information about the appearance. For example, a plurality of local descriptor values may be generated by feature extraction algorithms, parameters for classifiers, neural network configuration data, and so forth, that characterizes the appearance of a representative of one or more of the item 102.

The item data may include one or more geometry data. The geometry data may include information indicative of size and shape of the item 102 in one, two, or three dimensions. For example, the geometry data may include the overall shape of an item 102, such as a cuboid, sphere, cylinder, and so forth. The geometry data may also include information such as length, width, depth, and so forth, of the item 102. Dimensional information in the geometry data may be measured in pixels, centimeters, inches, arbitrary units, and so forth. The geometry data may be for a single item 102, or a package, kit, or other grouping considered to be a single item 102.

The item data may indicate the types and quantities of items 102 that are expected to be stored at that particular inventory location such as in a particular lane on a shelf. The item data may include one or more inventory location identifiers (IDs). The inventory location ID is indicative of a particular area or volume of an inventory location such as a shelf that is designated for stowage of the type of item 102. For example, a single shelf may have several lanes, each with a different inventory location ID. Each of the different inventory location IDs may be associated with a lane having a particular area on the shelf designated for storage of a particular type of item 102. A single type of item 102 may be associated with a particular inventory location ID, a plurality of inventory location IDs may be associated with the single type of item 102, more than one type of item 102 may be associated with the particular inventory location ID, and so forth.

The storage area 1106 is configured to store the items 102. The storage area 1106 may be arranged in various physical configurations. In one implementation, the storage area 1106 may include one or more aisles 1112. The aisle 1112 may be configured with, or defined by, inventory locations 1114 on one or both sides of the aisle 1112. The inventory locations 1114 may include one or more of a shelf, a rack, a case, a cabinet, a bin, a floor location, or other suitable storage mechanisms for holding, supporting, or storing the items 102. For example, the inventory locations 1114 may comprise shelves with lanes designated therein. The inventory locations 1114 may be affixed to the floor or another portion of the structure of the facility 1102. The inventory locations 1114 may also be movable such that the arrangement of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116 and carts 1118 or other material handling apparatus may move within the facility 1102. For example, the user 1116 may move about within the facility 1102 to pick or place the items 102 in various inventory locations 1114, placing them on the cart 1118 for ease of transport. The cart 1118 is configured to carry or otherwise transport one or more items 102. For example, the cart 1118 may include a basket, cart, bag, bin, and so forth. In some implementations, the cart 1118 may include a camera 108. For example, as items 102 are placed into or removed from the cart 1118, the camera 108 may be used to acquire the image data 110 that is then used to read the tags 104 and generate tag data 130. The tag data 130 may then be used to determine the items 102 that are in the cart 1118.

Other material handling apparatuses such as robots, forklifts, cranes, aerial drones, and so forth, may move about the facility 1102 picking, placing, or otherwise moving the items 102. For example, a robot may pick an item 102 from a first inventory location 1114(1) and move the item 102 to a second inventory location 1114(2).

One or more sensors 1016 may be configured to acquire information in the facility 1102. The sensors 1016 may include the camera 108 described above. Other sensors 1016, such as weight sensors, touch sensors, and so forth may also be used. The sensors 1016 may be stationary or mobile, relative to the facility 1102. For example, the inventory locations 1114 may contain weight sensors to acquire weight sensor data of items 102 stowed therein and detection systems to acquire images of picking or placement of items 102 on shelves, and so forth. In another example, the facility 1102 may include cameras to obtain images of the user 1116 or other objects in the facility 1102. The sensors 1016 are discussed in more detail below with regard to FIG. 12.

While the storage area 1106 is depicted as having one or more aisles 1112, inventory locations 1114 storing the items 102, sensors 1016, and so forth, it is understood that the receiving area 1104, the transition area 1108, or other areas of the facility 1102 may be similarly equipped. Furthermore, the arrangement of the various areas within the facility 1102 is depicted functionally rather than schematically. For example, in some implementations, multiple different receiving areas 1104, storage areas 1106, and transition areas 1108 may be interspersed rather than segregated in the facility 1102.

The facility 1102 may include, or be coupled to, an inventory management system 134. The inventory management system 134 is configured to interact with users 1116 or devices such as sensors 1016, robots, material handling equipment, computing devices, and so forth, in one or more of the receiving area 1104, the storage area 1106, or the transition area 1108.

During operation of the facility 1102, the sensors 1016 may be configured to provide sensor data, or information based on the sensor data, to the inventory management system 134. The sensor data may include tag data 130, image data, non-image data such as weight sensor data obtained from weight sensors, and so forth.

The inventory management system 134 or other systems may use the sensor data to track the location of objects within the facility 1102, movement of the objects, or provide other functionality. Objects may include, but are not limited to, items 102, users 1116, carts 1118, and so forth. For example, a series of images acquired by a camera may indicate removal by the user 1116 of an item 102 from a particular location on the inventory location 1114 and placement of the item 102 on or at least partially within the cart 1118. The item 102 may be identified by using the camera 108 to produce image data 110 that is processed to determine the tag data 130 indicative of the tags 104 on the item 102. The resulting tag data 130 may be used to determine the type of item 102 that was picked or placed at the inventory location 1114.

The inventory management system 134 may include one or more software applications executing on a computer system to provide inventory management functions. These inventory management functions may include maintaining information indicative of the type, quantity, condition, cost, location, weight, or any other suitable parameters with respect to the items 102. The items 102 may be stocked, managed, or dispensed in terms of countable units, individual units, or multiple units, such as packages, cartons, crates, pallets, or other suitable aggregations. Alternatively, some items 102, such as bulk products, commodities, and so forth, may be stored in continuous or arbitrarily divisible amounts that may not be inherently organized into countable units. Such items 102 may be managed in terms of a measurable quantity such as units of length, area, volume, weight, time, duration, or other dimensional properties characterized by units of measurement. Generally speaking, a quantity of an item 102 may refer to either a countable number of individual or aggregate units of an item 102 or a measurable amount of an item 102, as appropriate.

When a customer order specifying one or more items 102 is received, or as a user 1116 progresses through the facility 1102, the corresponding items 102 may be selected or "picked" from the inventory locations 1114 containing those items 102. In various implementations, item picking may range from manual to completely automated picking. For example, in one implementation, a user 1116 may have a list of items 102 they desire and may progress through the facility 1102 picking items 102 from inventory locations 1114 within the storage area 1106 and placing those items 102 into a cart 1118. In other implementations, employees of the facility 1102 may pick items 102 using written or electronic pick lists derived from customer orders. These picked items 102 may be placed into the cart 1118 as the employee progresses through the facility 1102.

After items 102 have been picked, the items 102 may be processed at a transition area 1108. The transition area 1108 may be any designated area within the facility 1102 where items 102 are transitioned from one location to another or from one entity to another. For example, the transition area 1108 may be a packing station within the facility 1102. When the item 102 arrives at the transition area 1108, the items 102 may be transitioned from the storage area 1106 to the packing station. Information about the transition may be maintained by the inventory management system 134.

In another example, if the items 102 are departing the facility 1102, a list of the items 102 may be obtained and used by the inventory management system 134 to transition responsibility for, or custody of, the items 102 from the facility 1102 to another entity. For example, a carrier may accept the items 102 for transport with that carrier accepting responsibility for the items 102 indicated in the list. In another example, a user 1116 may purchase or rent the items 102 and remove the items 102 from the facility 1102. During use of the facility 1102, the user 1116 may move about the facility 1102 to perform various tasks, such as picking or placing the items 102 in the inventory locations 1114.

To facilitate operation of the facility 1102, the inventory management system 134 is configured to use the sensor data including the tag data 130, weight sensor data, image data and other information such as the item data, the physical layout data, and so forth, to generate interaction data 1120.

The interaction data 1120 may provide information about an interaction, such as a pick of an item 102 from the inventory location 1114, a place of an item 102 to the inventory location 1114, a touch made to an item 102 at the inventory location 1114, a gesture associated with an item 102 at the inventory location 1114, and so forth. The interaction data 1120 may include one or more of the type of interaction, interaction location identifier indicative of where from the inventory location 1114 the interaction took place, item identifier, quantity change to the item 102, user identifier, and so forth. The interaction data 1120 may then be used to further update the inventory data 1122. For example, the quantity of items 102 on hand at a particular lane on the shelf may be changed based on an interaction that picks or places one or more items 102.

The inventory management system 134 may combine or otherwise utilize data from different sensors 1016 of different types. For example, tag data 130 may be used in conjunction with weight data obtained from weight sensors 1016 at the inventory location 1114 to determine the interaction data 1120.

The inventory management system 134 may generate other data. In one implementation, user billing data may be generated that comprises a bill or invoice for the items 102 that have been taken into the custody of the user 1116. For example, as the user 1116 leaves the facility 1102 with their cart 1118, a list and cost associated with the purchase for those items 102 may be determined, taxes or other fees assessed, and that information included in the user billing data.

The inventory management system 134 may also maintain inventory data 1122. For example, the inventory data 1122 may comprise information such as quantity on hand at a particular inventory location, determine when to order additional items 102 for restock, and so forth.

In some implementations, the inventory management system 134 may use the tag data 130 to direct the movement of items 102 within the facility 1102. For example, the user 1116 may be wearing an augmented reality headset that presents audible or visual information to the user 1116. The system 100 may read the tags 104 on the item 102 and generate tag data 130 that identifies that item 102. The inventory management system 134 may use that tag data 130 to determine that the item 102 is to be stowed in a particular inventory location 1114. The inventory management system 134 may generate instructions to present prompts to the user 1116 by way of the augmented reality headset, directing the user 1116 to place the item 102 in the particular inventory location 1114.

Figure 12:
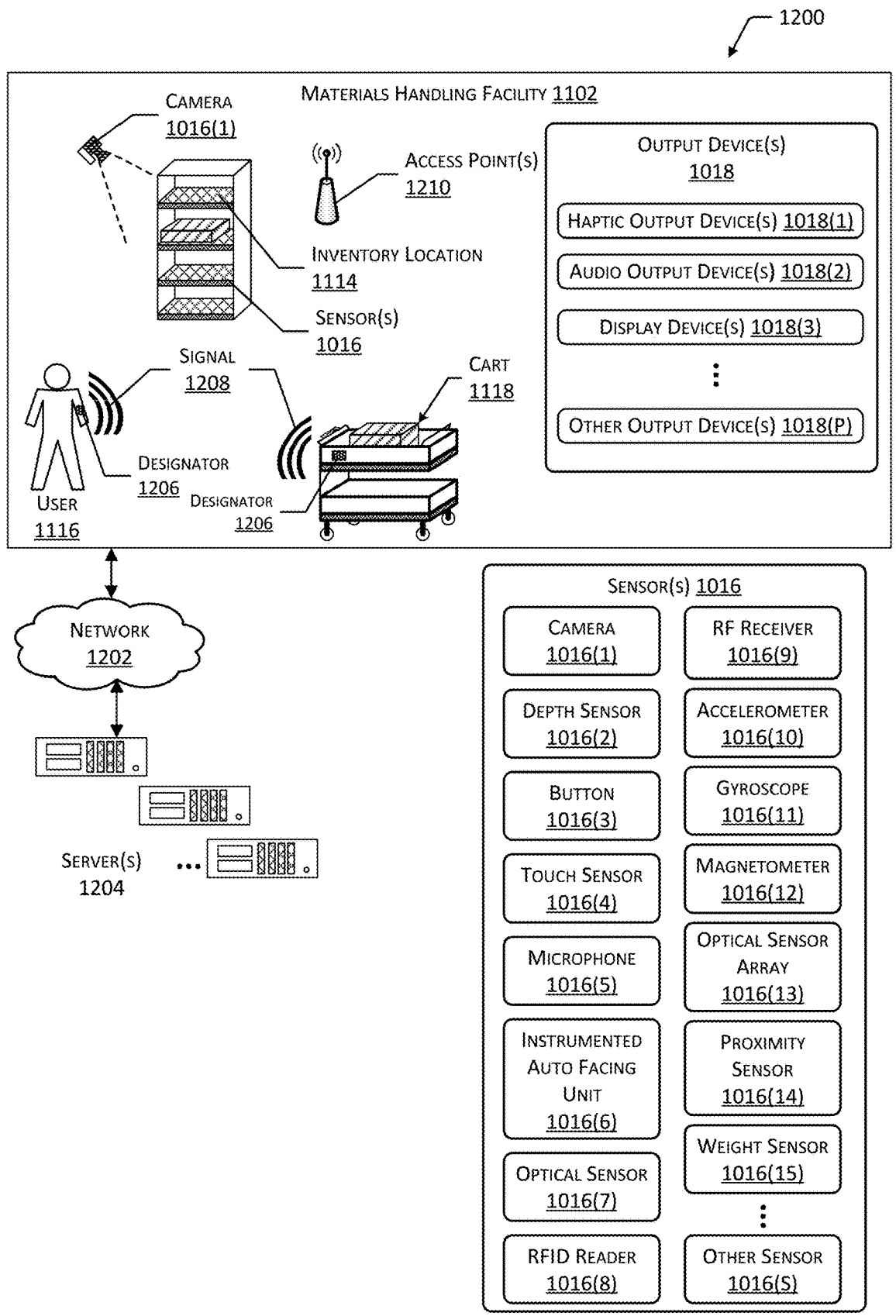
FIG. 12 is a block diagram illustrating additional details of the facility, according to some implementations.

FIG. 12 is a block diagram 1200 illustrating additional details of the facility 1102, according to some implementations. The facility 1102 may be connected to one or more networks 1202, which in turn connect to one or more servers 1204. The network 1202 may include private networks such as an institutional or personal intranet, public networks such as the Internet, or a combination thereof. The network 1202 may utilize wired technologies (e.g., wires, fiber optic cables, and so forth), wireless technologies (e.g., radio frequency, infrared, acoustic, optical, and so forth), or other connection technologies. The network 1202 is representative of any type of communication network, including one or more of data networks or voice networks. The network 1202 may be implemented using wired infrastructure (e.g., copper cable, fiber optic cable, and so forth), a wireless infrastructure (e.g., cellular, microwave, satellite, and so forth), or other connection technologies.

The servers 1204 may be configured to execute one or more modules or software applications associated with the inventory management system 134 or other systems. While the servers 1204 are illustrated as being in a location outside of the facility 1102, in other implementations, at least a portion of the servers 1204 may be located at the facility 1102. The servers 1204 may include memory, processors, and so forth such as described above with respect to the computing device 112.

The users 1116, the carts 1118, or other objects in the facility 1102 may be equipped with one or more designators 1206. The designators 1206 may be configured to emit a signal 1208. In one implementation, the designator 1206 may be a radio frequency identification (RFID) designator 1206 configured to emit a RF signal 1208 upon activation by an external signal. For example, the external signal may comprise a radio frequency signal or a magnetic field configured to energize or activate the RFID designator 1206. In another implementation, the designator 1206 may comprise a transmitter and a power source configured to power the transmitter. For example, the designator 1206 may comprise a Bluetooth Low Energy (BLE) transmitter and battery. In other implementations, the designator 1206 may use other techniques to indicate presence of the designator 1206. For example, an acoustic designator 1206 may be configured to generate an ultrasonic signal 1208, which is detected by corresponding acoustic receivers. In yet another implementation, the designator 1206 may be configured to emit an optical signal 1208.

The inventory management system 134 may be configured to use the designators 1206 for one or more of identification of the object, determining a location of the object, and so forth. For example, the users 1116 may wear designators 1206, the carts 1118 may have designators 1206 affixed, and so forth, which may be read and, based at least in part on signal strength, used to determine identity and location.

Generally, the inventory management system 134 or other systems associated with the facility 1102 may include any number and combination of input components, output components, and servers 1204.

The sensors 1016 may include the camera 108 described above. During operation, the system may produce tag data 130 that is used by the inventory management system 134. The one or more sensors 1016 may be arranged at one or more locations within the facility 1102. For example, the sensors 1016 may be mounted on or within a floor, wall, at a ceiling, at an inventory location 1114, on a cart 1118, may be carried or worn by a user 1116, and so forth.

The sensors 1016 may include one or more cameras 1016(1) or other imaging sensors. The one or more cameras 1016(1) may include imaging sensors configured to acquire images of a scene. The cameras 1016(1) are configured to detect light in one or more wavelengths including, but not limited to, terahertz, infrared, visible, ultraviolet, and so forth. The cameras 1016(1) may comprise charge coupled devices (CCD), complementary metal oxide semiconductor (CMOS) devices, microbolometers, and so forth. The inventory management system 134 may use image data acquired by the cameras 1016(1) during operation of the system 100 in the facility 1102. For example, the inventory management system 134 may identify items 102, users 1116, carts 1118, and so forth, based at least in part on their appearance within the image data acquired by the cameras 1016(1). The cameras 1016(1) may be mounted in various locations within the facility 1102. For example, cameras 1016(1) may be mounted overhead, on inventory locations 1114, may be worn or carried by users 1116, may be affixed to carts 1118, and so forth.

One or more depth sensors 1016(2) may also be included in the sensors 1016. The depth sensors 1016(2) are configured to acquire spatial or three-dimensional (3D) data, such as depth information, about objects within a field of view (FOV). The depth sensors 1016(2) may include range cameras, lidar systems, sonar systems, radar systems, structured light systems, stereo vision systems, optical interferometry systems, and so forth. The inventory management system 134 may use the 3D data acquired by the depth sensors 1016(2) to identify objects, determine a location of an object in 3D real space, and so forth.

One or more buttons 1016(3) may be configured to accept input from the user 1116. The buttons 1016(3) may comprise mechanical, capacitive, optical, or other mechanisms. For example, the buttons 1016(3) may comprise mechanical switches configured to accept an applied force from a touch of the user 1116 to generate an input signal. The inventory management system 134 may use data from the buttons 1016(3) to receive information from the user 1116. For example, the cart 1118 may be configured with a button 1016(3) to accept input from the user 1116 and send information indicative of the input to the inventory management system 134.

The sensors 1016 may include one or more touch sensors 1016(4). The touch sensors 1016(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 134 may use data from the touch sensors 1016(4) to receive information from the user 1116. For example, the touch sensor 1016(4) may be integrated with the cart 1118 to provide a touchscreen with which the user 1116 may select from a menu one or more particular items 102 for picking, enter a manual count of items 102 at an inventory location 1114, and so forth.

One or more microphones 1016(5) may be configured to acquire information indicative of sound present in the environment. In some implementations, arrays of microphones 1016(5) may be used. These arrays may implement beamforming techniques to provide for directionality of gain. The inventory management system 134 may use the one or more microphones 1016(5) to acquire information from acoustic designators 1206, accept voice input from the users 1116, determine ambient noise level, and so forth.

The sensors 1016 may include instrumented auto facing units (IAFUs) 1016(6). The AFU 1016(6) may comprise a position sensor configured to provide data indicative of displacement of a pusher. As an item 102 is removed from the AFU 1016(6), the pusher moves, such as under the influence of a spring, and pushes the remaining items 102 in the AFU 1016(6) to the front of the inventory location 1114. By using data from the position sensor and given item data such as a depth of an individual item 102, a count may be determined, based on a change in position data. For example, if each item 102 is 1 inch deep, and the position data indicates a change of 12 inches, the quantity held by the AFU 1016(6) may have changed by 12 items 102. This count information may be used to confirm or provide a cross check for a count obtained by other means, such as analysis of the weight sensor data.

The sensors 1016 may include one or more optical sensors 1016(7). The optical sensors 1016(7) may be configured to provide data indicative of one or more of color or intensity of light impinging thereupon. For example, the optical sensor 1016(7) may comprise a photodiode and associated circuitry configured to generate a signal or data indicative of an incident flux of photons. As described below, the optical sensor array 1016(13) may comprise a plurality of the optical sensors 1016(7). The optical sensors 1016(7) may include photodiodes, photoresistors, photovoltaic cells, quantum dot photoconductors, bolometers, pyroelectric infrared detectors, and so forth. For example, the optical sensor 1016(7) may use germanium photodiodes to detect infrared light.

One or more radio frequency identification (RFID) readers 1016(8), near field communication (NFC) systems, and so forth, may be included as sensors 1016. For example, the RFID readers 1016(8) may be configured to read the RF designators 1206. Information acquired by the RFID reader 1016(8) may be used by the inventory management system 134 to identify an object associated with the RF designator 1206 such as the item 102, the user 1116, the cart 1118, and so forth. For example, based on information from the RFID readers 1016(8) detecting the RF designator 1206 at different times and RFID readers 1016(8) having different locations in the facility 1102, a velocity of the RF designator 1206 may be determined.

One or more RF receivers 1016(9) may also be included as sensors 1016. In some implementations, the RF receivers 1016(9) may be part of transceiver assemblies. The RF receivers 1016(9) may be configured to acquire RF signals 1208 associated with Wi-Fi, Bluetooth, ZigBee, 2G, 3G, 4G, LTE, or other wireless data transmission technologies. The RF receivers 1016(9) may provide information associated with data transmitted via radio frequencies, signal strength of RF signals 1208, and so forth. For example, information from the RF receivers 1016(9) may be used by the inventory management system 134 to determine a location of an RF source, such as a communication interface onboard the cart 1118.

The sensors 1016 may include one or more accelerometers 1016(10), which may be worn or carried by the user 1116, mounted to the cart 1118, and so forth. The accelerometers 1016(10) may provide information such as the direction and magnitude of an imposed acceleration. Data such as rate of acceleration, determination of changes in direction, speed, and so forth, may be determined using the accelerometers 1016(10).

A gyroscope 1016(11) may provide information indicative of rotation of an object affixed thereto. For example, the cart 1118 or other objects may be equipped with a gyroscope 1016(11) to provide data indicative of a change in orientation of the object.

A magnetometer 1016(12) may be used to determine an orientation by measuring ambient magnetic fields, such as the terrestrial magnetic field. The magnetometer 1016(12) may be worn or carried by the user 1116, mounted to the cart 1118, and so forth. For example, the magnetometer 1016(12) mounted to the cart 1118 may act as a compass and provide information indicative of which direction the cart 1118 is oriented.

An optical sensor array 1016(13) may comprise one or optical sensors 1016(7). The optical sensors 1016(7) may be arranged in a regular, repeating, or periodic two-dimensional arrangement such as a grid. The optical sensor array 1016 (13) may generate image data. For example, the optical sensor array 1016(13) may be arranged within or below an inventory location 1114 and obtain information about shadows of items 102, hand of the user 1116, and so forth.

The sensors 1016 may include proximity sensors 1016 (14) used to determine presence of an object, such as the user 1116, the cart 1118, and so forth. The proximity sensors 1016(14) may use optical, electrical, ultrasonic, electromagnetic, or other techniques to determine a presence of an object. In some implementations, the proximity sensors 1016(14) may use an optical emitter and an optical detector to determine proximity. For example, an optical emitter may emit light, a portion of which may then be reflected by the object back to the optical detector to provide an indication that the object is proximate to the proximity sensor 1016 (14). In other implementations, the proximity sensors 1016 (14) may comprise a capacitive proximity sensor 1016(14) configured to provide an electrical field and determine a change in electrical capacitance due to presence or absence of an object within the electrical field.

The proximity sensors 1016(14) may be configured to provide sensor data indicative of one or more of a presence or absence of an object, a distance to the object, or characteristics of the object. An optical proximity sensor 1016(14) may use time-of-flight (ToF), structured light, interferometry, or other techniques to generate the distance data. For example, ToF determines a propagation time (or "roundtrip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1016 such as a camera 1016(1). Based on an apparent distance between the features of the structured light pattern, the distance to the object may be calculated. Other techniques may also be used to determine distance to the object. In another example, the color of the reflected light may be used to characterize the object, such as skin, clothing, cart 1118, and so forth.

One or more weight sensors 1016(15) are configured to measure the weight of a load, such as the item 102, the cart 1118, or other objects. The weight sensors 1016(15) may be configured to measure the weight of the load at one or more of the inventory locations 1114, the cart 1118, on the floor of the facility 1102, and so forth. For example, the shelf may include a plurality of lanes or platforms, with one or more weight sensors 1016(15) beneath each one to provide weight sensor data about an individual lane or platform. The weight sensors 1016(15) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1016(15) may operate as transducers that generate one or more signals based on an applied force, such as that of the load due to gravity. For example, the weight sensor 1016(15) may comprise a load cell having a strain gauge and a structural member that deforms slightly when weight is applied. By measuring a change in the electrical characteristic of the strain gauge, such as capacitance or resistance, the weight may be determined. In another example, the weight sensor 1016(15) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 134 may use the data acquired by the weight sensors 1016(15) to identify an object, determine a change in the quantity of objects, determine a location of an object, maintain shipping records, and so forth.

The sensors 1016 may include other sensors 1016(S) as well. For example, the other sensors 1016(S) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 1016(1) or other sensors 1016(S) may include hardware processors, memory, and other elements configured to perform various functions. For example, the cameras 1016(1) may be configured to generate image data, send the image data to another device such as the computing device 112, and so forth.

The facility 1102 may include one or more access points 1210 configured to establish one or more wireless networks. The access points 1210 may use Wi-Fi, NFC, Bluetooth, or other technologies to establish wireless communications between a device and the network 1202. The wireless networks allow the devices to communicate with one or more of the sensors 1016, the inventory management system 134, the designator 1206, a communication device of the cart 1118, or other devices.

Output devices 1018 may also be provided in the facility 1102. The output devices 1018 are configured to generate signals, which may be perceived by the user 1116 or detected by the sensors 1016.

Haptic output devices 1018(1) are configured to provide a signal that results in a tactile sensation to the user 1116. The haptic output devices 1018(1) may use one or more mechanisms such as electrical stimulation or mechanical displacement to provide the signal. For example, the haptic output devices 1018(1) may be configured to generate a modulated electrical signal, which produces an apparent tactile sensation in one or more fingers of the user 1116. In another example, the haptic output devices 1018(1) may comprise piezoelectric or rotary motor devices configured to provide a vibration, which may be felt by the user 1116.

One or more audio output devices 1018(2) may be configured to provide acoustic output. The acoustic output includes one or more of infrasonic sound, audible sound, or ultrasonic sound. The audio output devices 1018(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1018(3) may be configured to provide output, which may be seen by the user 1116 or detected by a light-sensitive sensor such as a camera 1016(1) or an optical sensor 1016(7). In some implementations, the display devices 1018(3) may be configured to produce output in one or more of infrared, visible, or ultraviolet light. The output may be monochrome or in color. The display devices 1018(3) may be one or more of emissive, reflective, microelectromechanical, and so forth. An emissive display device 1018(3), such as using LEDs, is configured to emit light during operation. In comparison, a reflective display device 1018(3), such as using an electrophoretic element, relies on ambient light to present an image. Backlights or front lights may be used to illuminate non-emissive display devices 1018(3) to provide visibility of the output in conditions where the ambient light levels are low.

The display devices 1018(3) may be located at various points within the facility 1102. For example, the addressable displays may be located on inventory locations 1114, carts 1118, on the floor of the facility 1102, and so forth.

Other output devices 1018(P) may also be present. For example, the other output devices 1018(P) may include scent/odor dispensers, document printers, 3D printers or fabrication equipment, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the system and techniques described above can be utilized in a variety of devices, environments, and situations. For example, the tags 104 may be placed on a user or other object and used to obtain motion capture data. In another example, the tags 104 may be placed on particular objects or targets and may be used to provide for annotation, registration, calibration, or other operations associated with computer vision, machine learning, and so forth. The systems and techniques allow for the tags 104 to be read while suppressing or omitting the background.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    determining an input value;
    generating, based on the input value, a matrix having two dimensions, wherein the matrix comprises a plurality of elements and each element of the matrix is representative of one or more bits;
    determining a first metric of the matrix, wherein the first metric is indicative of a variation between one or more adjacent elements of the matrix;
    determining the first metric exceeds a threshold value; and
    generating a representation of a tag based on the first metric exceeding the threshold value.

2. The method of claim 1, wherein:
    a value of a corresponding element at each corner of the matrix comprises a first predetermined value; and
    between one and eleven other elements of the matrix have a second predetermined value.

3. The method of claim 1, further comprising:
    for at least one element of the matrix:
        determining one or more adjacent elements;
        determining a difference between a value of the at least one element and a value of each of the one or more adjacent elements;
        determining absolute values of the differences; and
        determining a sum of the absolute values of the differences of the one or more adjacent elements; and
    performing a sum of the sum of the absolute values of the differences.

4. The method of claim 3, further comprising:
    determining a number of rows in the matrix;
    determining a number of columns in the matrix;
    determining a number of elements adjacent to the at least one element;
    determining a normalization factor by multiplying the number of rows in the matrix by the number of columns in the matrix by the number of elements adjacent to the at least one element; and
    determining the first metric by multiplying the sum of the sum of the absolute values of the differences by the normalization factor.

5. The method of claim 1, wherein the representation of the tag comprises one or more of:
    a set of instructions executable to produce the tag, or
    image data.

6. The method of claim 1, further comprising:
    presenting the tag on one or more of an item, an object, or a display; and
    wherein the tag is visible under one or more of infrared light or ultraviolet light.

7. The method of claim 1, further comprising:
    acquiring image data;
    determining an array of cells within the image data, wherein each cell comprises one or more pixels in the image data;
    determining a first set of values for the cells in the array, wherein the first set of values comprises a bit value and a confidence value for each of the cells in the array;
    determining the first set of values passes a validation check; and
    determining tag data associated with the tag, based on the first set of values.

8. The method of claim 1, further comprising:
    acquiring image data;
    determining an array of cells within the image data, wherein each cell comprises one or more pixels in the image data;
    determining a first set of values for the cells in the array, wherein the first set of values comprises a bit value and a confidence value for each of the cells in the array;
    determining tag data associated with the tag, based on the first set of values;
    determining one or more data cells of the tag data; and
    identifying an item associated with the tag, based on information within the one or more data cells.

9. A system comprising:
    a memory, storing first computer-executable instructions; and
    a hardware processor to execute the first computer-executable instructions to:
        determine an input value;
        generate, based on the input value, a matrix, wherein the matrix comprises a plurality of elements and each element of the matrix is representative of one or more values;
        determine a variability metric of the matrix;
        determine the variability metric of the matrix exceeds a threshold value; and
        generate a representation of a tag.

10. The system of claim 9, wherein:
    the tag comprises one or more cells;
    each of the one or more cells of the tag comprises a bit value that is based on a corresponding element of the matrix; and the hardware processor to further execute the first computer-executable instructions to:
determine one or more reference cells of the one or more cells of the tag;
determine one or more validation cells of the one or more cells of the tag;
determine one or more data cells of the one or more cells of the tag; and include one or more of the one or more reference cells, the one or more validation cells, or the one or more data cells in particular positions within the tag.

11. The system of claim 9, wherein:
the tag comprises one or more cells; and
each of the one or more cells comprises a bit value that is based on a corresponding element of the matrix; and
the hardware processor to further execute the first computer-executable instructions to:
include one or more reference cells of the one or more cells of the tag in one or more corners of the tag, wherein the one or more reference cells are used to detect edges and an orientation of the tag; and
include one or more validation cells of the one or more cells of the tag along three edges and a center of the tag, wherein the one or more validation cells are used to store one or more of a hash value, an error correction value, or other error detection value.

12. The system of claim 9, wherein:
the tag comprises one or more cells;
each of the one or more cells comprises a bit value that is based on a corresponding element of the matrix; and
the hardware processor to further execute the first computer-executable instructions to:
designate one or more of the one or more cells of the tag as data cells, wherein the data cells are used to encode tag data; and
wherein placement of the data cells in the tag is non-sequential.

13. The system of claim 9, the hardware processor to further execute the first computer-executable instructions to:
present the tag using one or more of:
a label,
an object,
an item, or
a display device.

14. The system of claim 9, wherein the tag is indicative of one or more of:
shipment information,
stock keeping information,
serial number information,
expiration date information,
error correction information, or
a network address.

15. The system of claim 9, wherein the tag is generated to be visible at wavelengths that include one or more of:
infrared light, or
ultraviolet light.

16. A system comprising:
a memory, storing first computer-executable instructions; and
a hardware processor to execute the first computer-executable instructions to:
determine an input value;
determine a matrix based on the input value, the matrix comprising a plurality of elements;
determine a variability metric of the matrix, wherein the variability metric is indicative of a variability between at least one element and one or more adjacent elements of the matrix;
compare the variability metric of the matrix to a threshold value; and
determine, based on the variability metric of the matrix exceeding the threshold value, that the matrix is usable as a tag.

17. The system of claim 16, wherein the first computer-executable instructions executed to determine the variability metric of the matrix further comprise instructions to:
process the matrix with a sliding window to determine the variability between the at least one element and the one or more adjacent elements.

18. The system of claim 16, the hardware processor to further execute the first computer-executable instructions to:
generate a representation of the tag; and
affix the tag to one or more of an object or an item.

19. The system of claim 16, further comprising:
a camera to acquire image data that comprises the tag; and
the hardware processor to further execute the first computer-executable instructions to:
determine a region of the image data;
determine a plurality of cells in the region;
determine a first set of values for the plurality of cells in the region, wherein the first set of values comprises a bit value and a confidence value for each of the cells in the region;
determine the first set of values passes a validation check; and
determine tag data associated with the tag, based on the first set of values.

20. The system of claim 16, the hardware processor to further execute the first computer-executable instructions to:
determine a second variability metric of a second matrix is below the threshold value; and
discard or flag the second matrix as not usable as a tag.

* * * * *